(12) United States Patent
Katano

(10) Patent No.: US 10,291,815 B2
(45) Date of Patent: May 14, 2019

(54) INFORMATION PROCESSING APPARATUS CAPABLE OF COMMUNICATING WITH ANY OF ONE OR MORE SERVERS ACCORDING TO A FIRST PROTOCOL AND A SECOND PROTOCOL, INFORMATION PROCESSING SYSTEM INCLUDING THE INFORMATION PROCESSING APPARATUS, AND A METHOD PERFORMED BY THE INFORMATION PROCESSING APPARATUS

(71) Applicant: CANON KABUSHIKI KAISHA, Tokyo (JP)

(72) Inventor: Kiyoshi Katano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/818,517

(22) Filed: Nov. 20, 2017

(65) Prior Publication Data

US 2018/0152587 A1 May 31, 2018

(30) Foreign Application Priority Data

Nov. 25, 2016 (JP) .................. 2016-229030

(51) Int. Cl.
*G06F 13/14* (2006.01)
*H04N 1/327* (2006.01)
*G06F 3/12* (2006.01)
*H04N 1/00* (2006.01)

(52) U.S. Cl.
CPC ......... *H04N 1/3278* (2013.01); *G06F 3/1207* (2013.01); *G06F 3/1231* (2013.01); *G06F 3/1236* (2013.01); *G06F 3/1288* (2013.01); *H04N 1/00344* (2013.01); *H04N 2201/0082* (2013.01); *H04N 2201/3219* (2013.01)

(58) Field of Classification Search
CPC .............. H04N 1/3278; H04N 1/00344; G06F 3/1236; G06F 3/1288; G06F 3/1231
USPC ........................ 358/1.15; 709/203, 227, 228
See application file for complete search history.

(56) References Cited

U.S. PATENT DOCUMENTS

| 2012/0188600 A1* | 7/2012 | Oshima ................. G06F 3/1205 |
| | | 358/1.15 |
| 2012/0194864 A1* | 8/2012 | Oshima ................. G06F 3/1204 |
| | | 358/1.15 |
| 2014/0268236 A1* | 9/2014 | Ohara .................. G06F 3/1224 |
| | | 358/1.15 |

FOREIGN PATENT DOCUMENTS

| CN | 102681801 A | 9/2012 |
| EP | 2993882 A2 | 3/2016 |
| JP | 2012-187867 A | 10/2012 |

* cited by examiner

*Primary Examiner* — Jamares Q Washington
(74) *Attorney, Agent, or Firm* — Canon U.S.A., Inc. IP Division

(57) ABSTRACT

In an information processing apparatus, in a case where a particular notification is received via a first connection with any of one or more servers using a first protocol, a second connection with any of the one or more servers is established using a second protocol and data to be processed is acquired via the second connection. In a case where a particular status change occurs in the information processing apparatus, the second connection is established even in a state in which the first connection is not established, and status information is transmitted to any of the one or more servers.

22 Claims, 19 Drawing Sheets

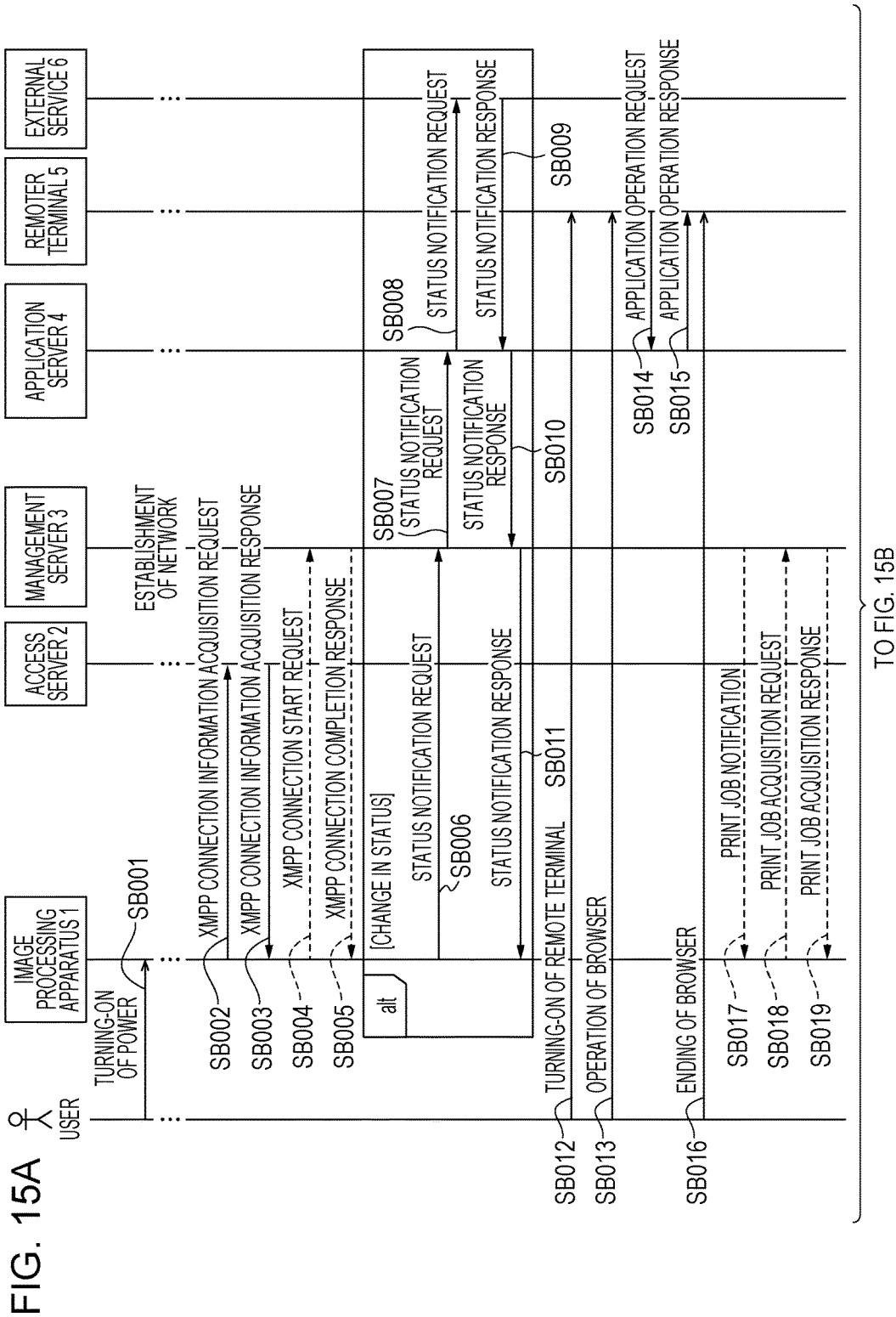

INFORMATION PROCESSING APPARATUS CAPABLE OF COMMUNICATING WITH ANY OF ONE OR MORE SERVERS ACCORDING TO A FIRST PROTOCOL AND A SECOND PROTOCOL, INFORMATION PROCESSING SYSTEM INCLUDING THE INFORMATION PROCESSING APPARATUS, AND A METHOD PERFORMED BY THE INFORMATION PROCESSING APPARATUS

BACKGROUND OF THE INVENTION

Field of the Invention

The present invention relates to an information processing apparatus capable of communicating with any of one or more servers using a first protocol and also capable of communicating with any of the one or more servers using a second protocol.

Description of the Related Art

In a service available, a Web server sends, via the Internet, a notification of a job of printing, reading a document, or the like to an information processing apparatus, and the information processing apparatus executes the job. A user of this service is allowed to generate a job by accessing the service from a remote terminal different from the information processing apparatus that executes the job. Examples of remote terminals sable to access the service include a personal computer, a portable terminal, or the like having a Web browser capability.

Japanese Patent Laid-Open No. 2012-187867 discloses a technique in which a server sends a notification of a print job to a printer, and, in response to receiving the notification, the printer acquires the print job and performs printing.

As described in Japanese Patent Laid-Open No. 2012-187867, when the printer acquires a job in response to receiving a notification, there is a possibility that a protocol used in connection for sending the notification is different from a protocol for acquiring the job, and thus there is a possibility that in response to receiving the notification, a connection for acquiring the job is established.

However, for example, in a case where status information in terms of a status of an information processing apparatus is tried to be transmitted according to the protocol for use in the acquisition of the job, the connection according to the protocol for the acquisition of the job is not established in a state where no notification is received. Therefore, there is a possibility that it is not allowed to transmit status information to a server unless a notification has been received from the server.

SUMMARY OF THE INVENTION

In view of the above, the present invention provides a technique to properly transmit status information.

According to an aspect of the present invention, an information processing apparatus, capable of communicating with any of one or more servers according to a first protocol and also capable of communicating with any of the one or more servers according to a second protocol, includes an acquisition unit configured to, in a case where a notification is received via a first connection with any of the one or more servers according to the first protocol, establish a second connection with any of the one or more servers according to the second protocol and configured to acquire, via the second connection, data to be processed on the information processing apparatus, an execution unit configured to execute a process on the data, the process to be executed being dependent on the acquired data, and a transmission unit configured to establish the second connection to status information on the status of the information processing apparatus to any of the one or more servers in a case where predetermined status of the information processing apparatus is changed, the second connection being established to transmit status information even in the case that the first connection with any of the one or more servers is not established.

Further features of the present invention will become apparent from the following description of exemplary embodiments with reference to the attached drawings.

BRIEF DESCRIPTION OF THE DRAWINGS

FIG. 14A is a sequence diagram illustrating a part of a sequence of a status notification process performed via a connection established as required between an image processing apparatus and a server, and FIG. 14B is a sequence diagram illustrating a part following that illustrated in FIG. 14A.

FIGS. 15A and 15B respectively illustrate first and second parts of a sequence diagram of a status notification process performed by an image processing apparatus and a server while communicating with each other via an always-on connection. FIGS. 14A and 14B respectively illustrate first and second parts of a sequence diagram of a status notification process performed by an image processing apparatus and a server while communicating with each other via a connection established temporarily as required.

DESCRIPTION OF THE EMBODIMENTS

Embodiments of the present invention are described in detail below with reference to drawings.

Figure 1:
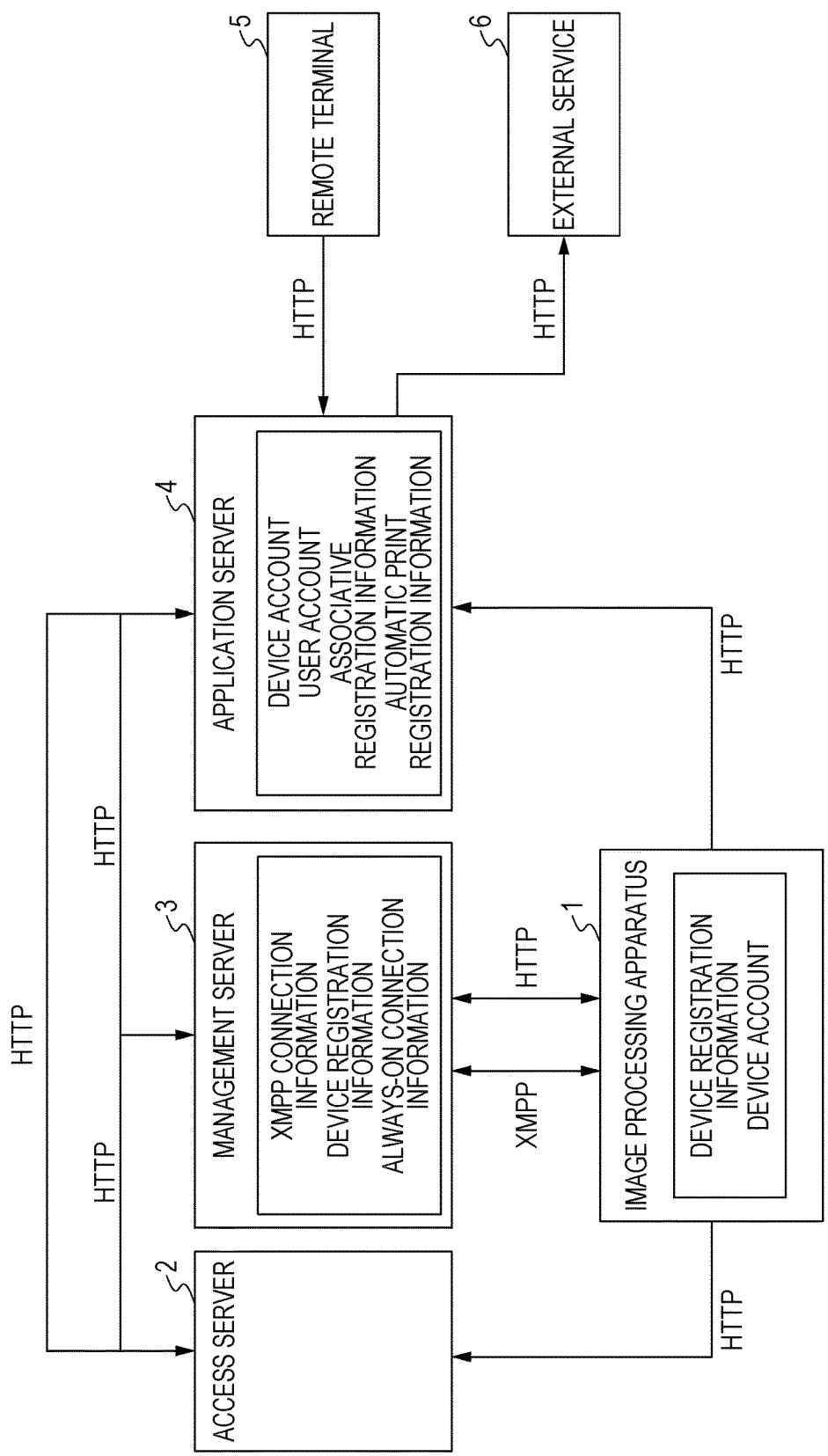
FIG. 1 is a diagram illustrating a configuration of an information processing system.

FIG. 1 is a diagram illustrating a configuration of an information processing system according to an embodiment. The information processing system illustrated in FIG. 1 provides an image processing service in which an image processing apparatus is controlled, via the Internet, to print an image or read a document. More specifically, a user of the image processing service issues a print command or a read command using an operation unit of a remote terminal 5 or an operation unit of an image processing apparatus 1. In response, a process is performed by an access server 2, a management server 3, and an application server 4, such that a print job or a read job is sent to the image processing apparatus 1, and the image processing apparatus 1 performs printing or reading of a document. An external service 6 is a server that monitors a status change of the image processing apparatus 1. More specifically, the server serving as the external service 6 monitors a remaining amount of supply consumed by the image processing apparatus, an open/close state of a cover, an occurrence of an error, etc. A further detailed description is provided below.

The image processing apparatus 1 is an example of an information processing apparatus that executes a job. The image processing apparatus 1 has, for example, a print function to print an image on a print medium, a read function to read a document, etc. The image processing apparatus 1 can be connected to the Internet to access the access server 2, the management server 3, and the application server 4.

The remote terminal 5 is, for example, a personal computer (PC), a portable telephone, a smartphone, a tablet device, or the like. A Web browser is installed in the remote terminal 5, and thus it is possible to access the application server 4 via the Internet. The access server 2, the management server 3, and the application server 4 are capable of communicating with each other via a network.

To monitor the status change of the image processing apparatus 1, the external service 6 receives status information indicating the state of the image processing apparatus 1 from the application server 4. The status information may be, for example, status information in terms of the print function of the image processing apparatus 1, and the status information is transmitted from the image processing apparatus 1 to the application server 4. More specifically, the status information transmitted may include recording agent information related to a recording agent such as ink, toner, or the like used in printing, and sheet information related to printing sheets used in printing. The recording agent information may include information indicating the remaining amount of the recording agent, and the sheet information may include information indicating the remaining number of sheets. In a case where an error occurs in terms of the recording agent or the printing sheet, status information indicating the error may be transmitted. For example, in a case where the reaming amount of ink in the image processing apparatus 1 is low, an ink-low error may be transmitted. When a further reduction in the remaining about of ink occurs, a no-ink error may be transmitted. On the other hand, in a case where the image processing apparatus 1 has no printing sheets, a no-sheet error may be transmitted. In a case where jam of a printing sheet occurs in the image processing apparatus 1, a jam error may be transmitted.

The access server 2 is a server that provides information used by the image processing apparatus 1 to connect to the management server 3. The information stored in the access server 2 includes information indicating a host name of the management server 3, an identification ID (JID) for connection, information indicating a state of device registration (described later) in the management server 3, and information indicating whether an always-on connection is necessary or unnecessary. These pieces of information are stored in and managed by the management server 3. The access server 2 is allowed to acquire information, as required, from the management server 3. Note that there is no particular restriction on which server manages which information, and thus the configuration illustrated in FIG. 1 is merely an example.

The image processing apparatus 1 may transmit a request, using Hyper Text Transfer Protocol (HTTP), to the access server 2, and may receive a response thereby acquiring information for connecting to the management server 3.

The management server 3 is a server that manages a plurality of image processing apparatuses (including the image processing apparatus 1) using the image processing service. More specifically, the management server 3 registers identification information of each image processing apparatus and manages the identification information as device registration information. Furthermore, the management server 3 also stores always-on connection information indicating whether each image processing apparatus whose identification information is registered needs to be always connected to the management server 3.

The image processing apparatus 1 is capable of connecting to the management server 3 using Extensible Messaging and Presence Protocol (XMPP) based on the information acquired from the access server 2 and is capable of transmitting and receiving messages. The image processing apparatus 1 acquires the always-on connection information stored in the management server 3 and determines, based on the always-on connection information, whether it is necessary to always connect, using XMPP, to the management server 3. Details of this judgement process will be described later.

The application server 4 is a server that provides an image processing service using an image processing application to users of the image processing apparatus 1 and the remote terminal 5. When the application server 4 receives a request using HTTP, the application server 4 returns a response. To use a service provided by the application server 4, a user needs to create an account in the application server 4 using a terminal such as a personal computer, a smartphone, or the like in which a Web browser is installed. Note that a terminal for use in creating an account is not limited to the image processing apparatus 1 or the remote terminal 5, but other types of apparatuses may be used. In the application server 4, accounts created in the above-descried manner are stored as user accounts.

Furthermore, the application server 4 also stores device accounts corresponding to the respective image processing apparatuses (including the image processing apparatus 1). Each device account is an account for use by a corresponding one of the image processing apparatuses to access to the application server 4 and receive service therefrom. An account is issued separately for each of the image processing apparatuses.

When the image processing apparatus 1 executes a procedure (a device registration process) to register the image processing apparatus 1 in the management server 3, the image processing apparatus 1 can acquire a device account for use in accessing the application server 4. Furthermore, the device registration makes it possible for the image processing apparatus 1 to receive a notification of a job from the management server 3. Details of the device registration process will be described later.

To access the application server 4 using the remote terminal 5 to use a service, it is necessary to create a user account in the application server 4. The application server 4 makes an associative registration such that the user account is registered in association with the device account of the image processing apparatus 1 registered in the management server 3, and the application server 4 stores associative registration information. An operation performed by a user to make an associative registration is referred to, in the present embodiment, as a device addition operation.

The information stored in and managed by the management server 3 includes XMPP connection information for use by the image processing apparatus 1 to connect to the management server 3. The information stored in and managed by the application server 4 includes automatic printing registration information. The application server 4 provides an automatic printing service in which information about, for example, news, a weather forecast, or the like, is transmitted depending on a predetermined condition (for example, in terms of date/time) to an image processing apparatus such that the image processing apparatus is allowed to print the received information. The automatic printing registration information indicates an image processing apparatus that uses this automatic printing service.

The application server 4 determines, based on the associative registration information and the automatic printing registration information, whether an always-on connection is necessary or not, and the application server 4 notifies the management server 3 of the always-on connection information. The management server 3 stores the notified always-on connection information and manages it.

For example, in a case where, as for a certain image processing apparatus, associative registration information is not stored although a device account thereof is registered, this image processing apparatus may issue a request for use of a service (for example, a printing service). However, because associative registration information is not stored, a print job or a read job is not issued to this image processing apparatus from a remote terminal different from the image processing apparatus. Therefore, it is determined that it is not necessary to keep the always-on connection between the image processing apparatus and the management server 3 to acquire a print job or a read job from a remote terminal. Therefore, in this case, the application server 4 transmits, to the management server 3, always-on connection information indicating that the always-on connection is not necessary for this image processing apparatus. On the other hand, as for an image processing apparatus whose associative registration information is stored, this image processing apparatus 1 needs to properly detect a print job or a read job which may be issued at an arbitrary point of time by a remote terminal. Therefore, as for this image processing apparatus, the application server 4 transmits, to the management server 3, the always-on connection information indicating that the always-on connection is necessary for this image processing apparatus.

The management server 3 generates XMPP connection information according to the always-on connection information received from the application server 4. More specifically, in a case where the always-on connection information indicates that always-on XMPP connection is necessary, the management server 3 generates XMPP connection information for allowing the image processing apparatus 1 to make an always-on XMPP connection with the management server 3. On the other hand, in a case where the always-on connection information indicates that always-on XMPP connection is not necessary, the management server 3 generates XMPP connection information to control the image processing apparatus 1 not to make an always-on XMPP connection with the management server 3. The image processing apparatus 1 acquires the XMPP connection information generated in the above-described manner from the management server 3 and determines, based on the XMPP connection information, whether to always connect to the management server 3 or not.

In FIG. 1, the system includes three servers, that is, the access server 2, the management server 3, and the application server 4. However, this is merely an example, and the configuration of the system is not limited to this example. For example, the system may include only one server having functions of the three servers described above, or the system may include four or more servers among which the three server functions described above are distributed.

Figure 2:
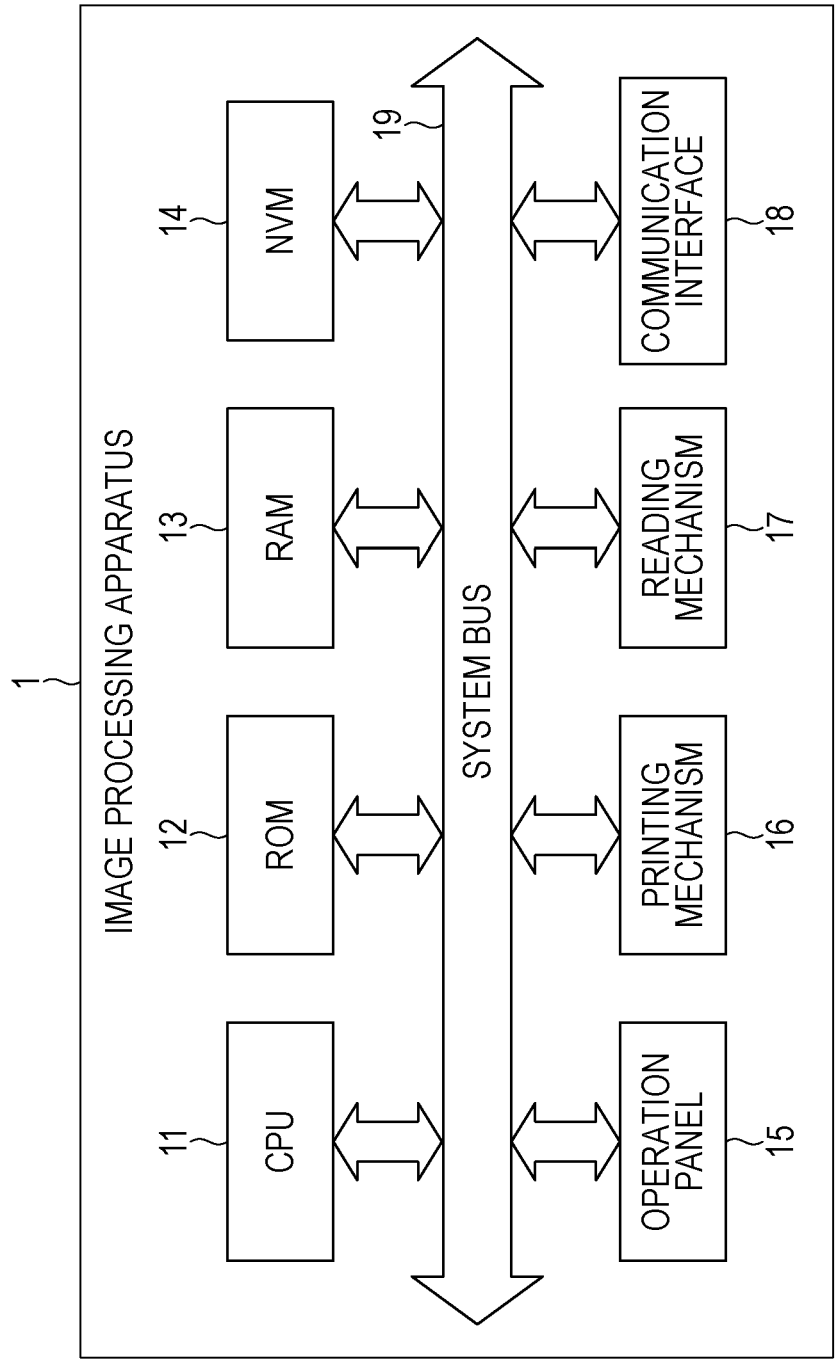
FIG. 2 is a block diagram illustrating a configuration of an image processing apparatus.

FIG. 2 is a block diagram illustrating a configuration of the image processing apparatus 1 according to the present embodiment. In FIG. 2, 11 denotes a CPU, 12 denotes a ROM, 13 denotes a RAM, 14 denotes a non-volatile memory (NVM), 15 denotes an operation panel, 16 denotes printing mechanism, 17 denotes a reading mechanism, 18 denotes a communication interface, and 19 denotes a system bus.

The image processing apparatus 1 operates with power supplied by a power supply unit (not illustrated). The CPU 11 controls the image processing apparatus 1 according to a program stored in the ROM 12 and using the RAM 13 as a work area. The non-volatile memory 14 is a writable-and-readable memory capable of retaining a storage content even in a state in which no power is supplied. The printing mechanism 16 performs printing under the control of the CPU 11. The reading mechanism 17 reads an image under the control of the CPU 11. The communication interface 18 is an interface for use in communication with an external apparatus. These are connected to each other via a system bus 19 such that they can be controlled.

The image processing apparatus 1 performs HTTP/XMPP communication via the communication interface 18. The operation panel 15 includes an LCD display screen. The image processing apparatus 1 further includes a built-in Web browser. The built-in Web browser displays, on the LCD display screen, a Hyper Text Markup Language (HTML) document acquired via HTTP communication.

The image processing apparatus 1 communicates with the access server 2 using an HTTP protocol and communicates with the management server 3 using an XMPP protocol. The image processing apparatus 1 communicates with the application server 4 using an HTTP protocol. In particular, in the image processing apparatus 1, an HTML document is acquired via the built-in Web browser from the application server 4, and a Web page provided by a Web service is displayed thereby allowing a user to use the service. The application server 4 is accessed not only by the image processing apparatus 1 but is also accessed by a remote terminal 5 having a Web browser capability to use a Web service.

Note that the access server 2, the management server 3, and the application server 4 also each include a processor such as a CPU, a non-volatile memory such as a ROM or a hard disk, and a work memory such as a RAM. In the access server 2, the management server 3, and the application server 4, the CPU provided in each of them executes a program, stored in the ROM or the hard disk, on a work memory thereby performing various kinds of controls according to the present embodiment.

Figure 3:
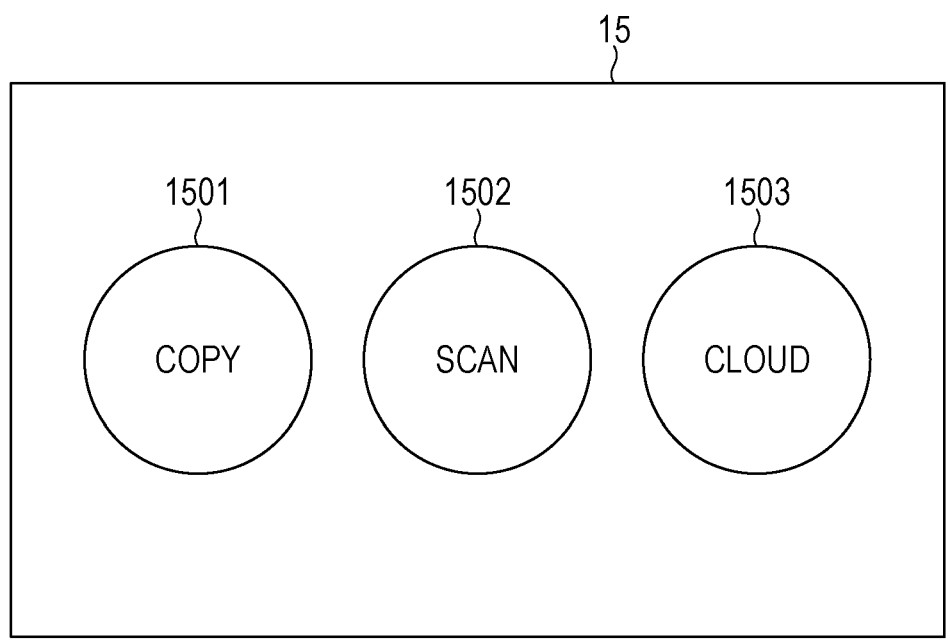
FIG. 3 illustrates an example of an LCD display screen of an operation panel.

FIG. 3 illustrates an example of an LCD display screen of the operation panel 15. In FIG. 3, 1501 denotes an icon indicating a copy operation, 1502 denotes an icon indicating a scan operation, and 1503 denotes an icon indicating a cloud operation. In the present embodiment, the cloud operation is an operation to activate the Web browser in the image processing apparatus 1 and use a service provided by the application server 4. A user of the image processing apparatus 1 issues, via the operation panel, a command to perform an operation indicated by an icon. When a cloud icon 1503 is operated, the Web browser installed in the image processing apparatus 1 is started.

The image processing apparatus 1 executes a process, described below with reference to FIG. 4, to determine whether an XMPP connection to the management server 3 is to be established or not. This process is executed when the power of the image processing apparatus 1 is turned on and the image processing apparatus 1 is started.

Figure 4:
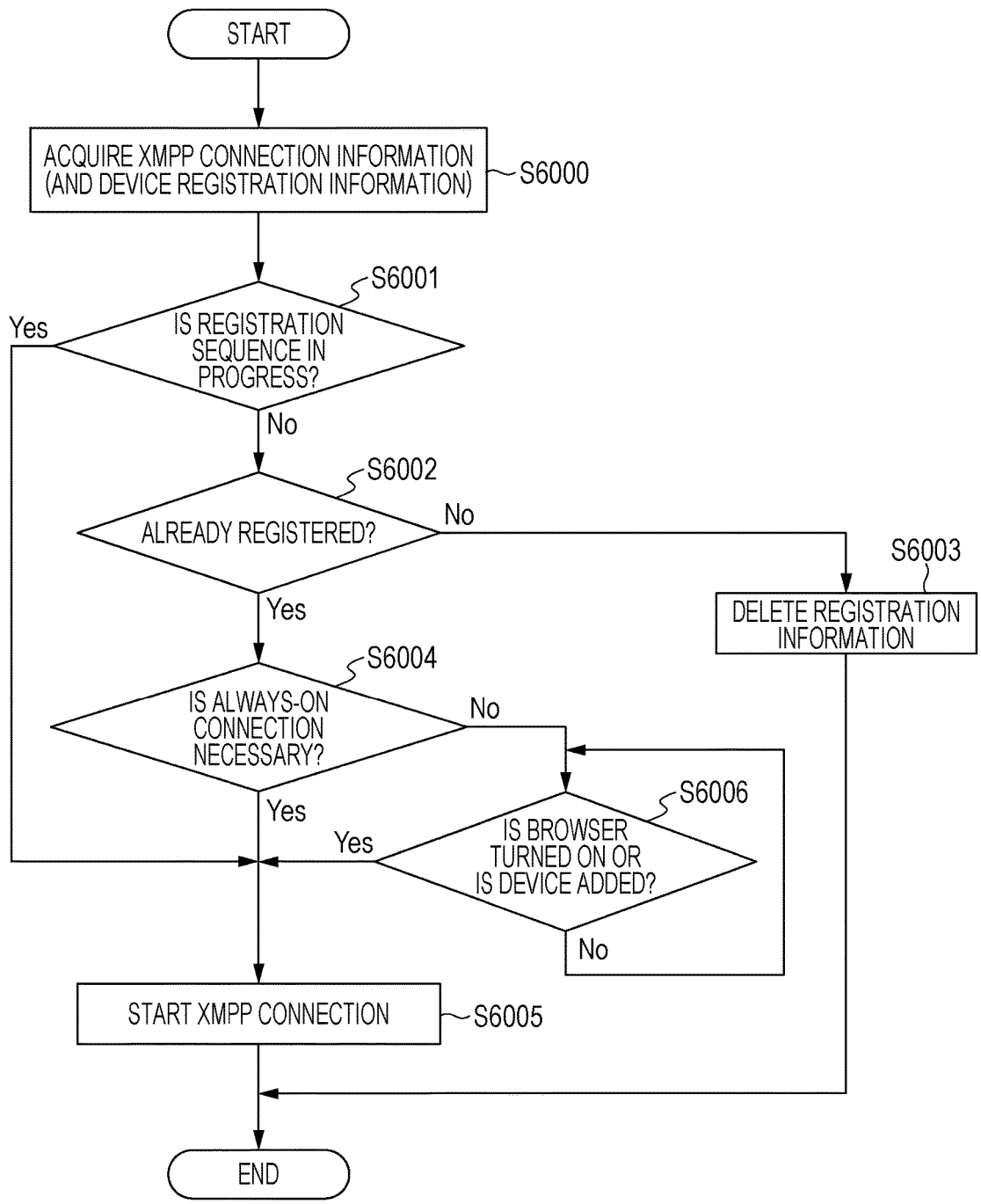
FIG. 4 is a flow chart illustrating a process, performed by an image processing apparatus, to acquire XMPP connection information and judge whether an XMPP connection is to be made or not.

FIG. 4 is a flow chart illustrating a process, performed by the image processing apparatus 1, to acquire XMPP connection information and determine whether an XMPP connection is to be established or not. The process illustrated in the flow chart in FIG. 4 is performed by the CPU 11 by loading a program stored in the ROM 12 into the RAM 13 and executing the program on the RAM 13.

In S6000, the CPU 11 transmits a request, using an HTTP protocol, to the access server 2. In response, XMPP connection information for the XMPP connection is sent to the CPU 11. In a case where device registration is stored in the access server 2, the device registration information is also sent to the CPU 11.

In S6001, the CPU 11 determines whether a device registration sequence is in progress. In the device registration sequence, in a case where the device registration in the management server 3 is completed, the management server 3 notifies, using XMPP, the image processing apparatus 1 of the completion of the registration. For this purpose, when the device registration sequence is in progress, an XMPP connection is necessary, and thus the processing flow proceeds to S6005. In S6005, the CPU 11 starts the XMPP connection to the management server 3.

In S6003, the CPU 11 determines whether the device has already been registered or not depending on whether the device registration information is included or not in the response from the management server 3. In a case where the device is not registered, it can be concluded that the device registration has been deleted in a state in which the connection to the server is disconnected. In this case, in S6003, the device registration information stored in the image processing apparatus 1 is deleted, and the process is ended. Therefore, the XMPP connection between the image processing apparatus 1 and the management server 3 is not established. This makes it possible to prevent the image processing apparatus 1 and the management server 3 from being connected to each other via XMPP connection although the device registration is deleted in the server and thus the image processing apparatus 1 is in a state in which it is not allowed to use the service.

In S6004, the CPU 11 makes a determination according to the XMPP connection information acquired in S6000 as to whether an always-on XMPP connection to the management server 3 is necessary or not. As described above, the application server 4 sends always-on connection information, according to associative registration information, to the management server 3. Thus, for example, in a case where a device account of the image processing apparatus 1 is not associated with a user account of service (in a case where no job is issued from a remote terminal to the image processing apparatus 1), the image processing apparatus 1 determines that the always-on connection to the management server 3 using XMPP is not necessary.

On the other hand, there is a case in which in the application server 4, the device account of the image processing apparatus 1 has already been associated with the user account (a job can be issued from a remote terminal to the image processing apparatus 1). In this case, the image processing apparatus 1 determines that an always-on connection, using XMPP, to the management server 3 is necessary.

In a case where it is determined in S6004 that the always-on connection is necessary, the processing flow proceeds to S6005, in which the CPU 11 establishes the XMPP connection. In a case where it is determined in S6004 that the always-on connection is unnecessary, the processing flow proceeds to S6006.

In S6006, the CPU 11 determines whether an operation of starting a Web browser or a device addition operation has been performed. In a case where one of these operations is performed, it is necessary to make an XMPP connection to the management server 3 to use service or to make an associative registration between the image processing apparatus 1 and the user account. Thus, if it is determined in S6006 that the operation of starting the Web browser or the device addition operation has been performed, then, in S6005, the CPU 11 starts establishing the XMPP connection to the management server 3. On the other hand, in a case where it is not determined in S6006 that the operation of starting the Web browser or the device addition operation has been performed, the process in S6006 is repeated. Thus, when a user performs an operation of starting a Web browser or a device addition operation, it is possible to properly establish an XMPP connection.

In the process illustrated in FIG. 4, in a case where it is determined, in S6004, based on the XMPP connection information acquired from the management server 3 that the always-on connection using XMPP is not necessary, the XMPP connection is not started. Thus, in a case where the image processing apparatus 1 is not registered in association with the application server 4, for example, when the power of the image processing apparatus 1 is turned on, the establishment of the XMPP connection is not performed. Thus, it is possible to prevent an XMPP connection from being established when the power is turned on although there is no possibility that a job notification is sent from a remote terminal.

In the process illustrated in FIG. 4, when a user performs an operation to use a service or to make an associative registration of the image processing apparatus and the user account, establishing of the XMPP connection is started. Thus, even if an XMPP connection is not established when the power of the image processing apparatus 1 is turned on, it is possible to start establishing an XMPP connection when the XMPP connection is necessary.

On the other hand, in a case where the device account of the image processing apparatus 1 has already been associated with the user account (in a case where there is a possibility that a job is issued from a remote terminal to the image processing apparatus 1), an XMPP connection is established when the power of the image processing apparatus 1 is turned on. Thus, in a case where when a user of a remote terminal sends a job issuing command at an arbitrary point of time, if the power of the image processing apparatus 1 is in the on-state, the XMPP connection has already been established. Thus, when such a job is issued in the above-described manner, the image processing apparatus 1 is capable of performing a specified process (printing, reading of a document, etc.) according to the issued job.

Note that when the Web browser is in operation, it is necessary to keep the XMPP connection such that it is possible to receive a notification of a job generated by the image processing apparatus 1 or the remote terminal 5. After the Web browser is turned off, the XMPP connection is no longer necessary. However, there is a possibility that a delay occurs in arrival of a notification of a job generated when the Web browser is in operation, and thus there is a possibility that a notification of a job is received after the Web browser is turned off. In view of the above, the XMPP connection may be further kept for a predetermined period of time after the Web browser is turned off. Also in the case in which the device addition operation is performed, the XMPP connection is kept in a similar manner.

Figure 5:
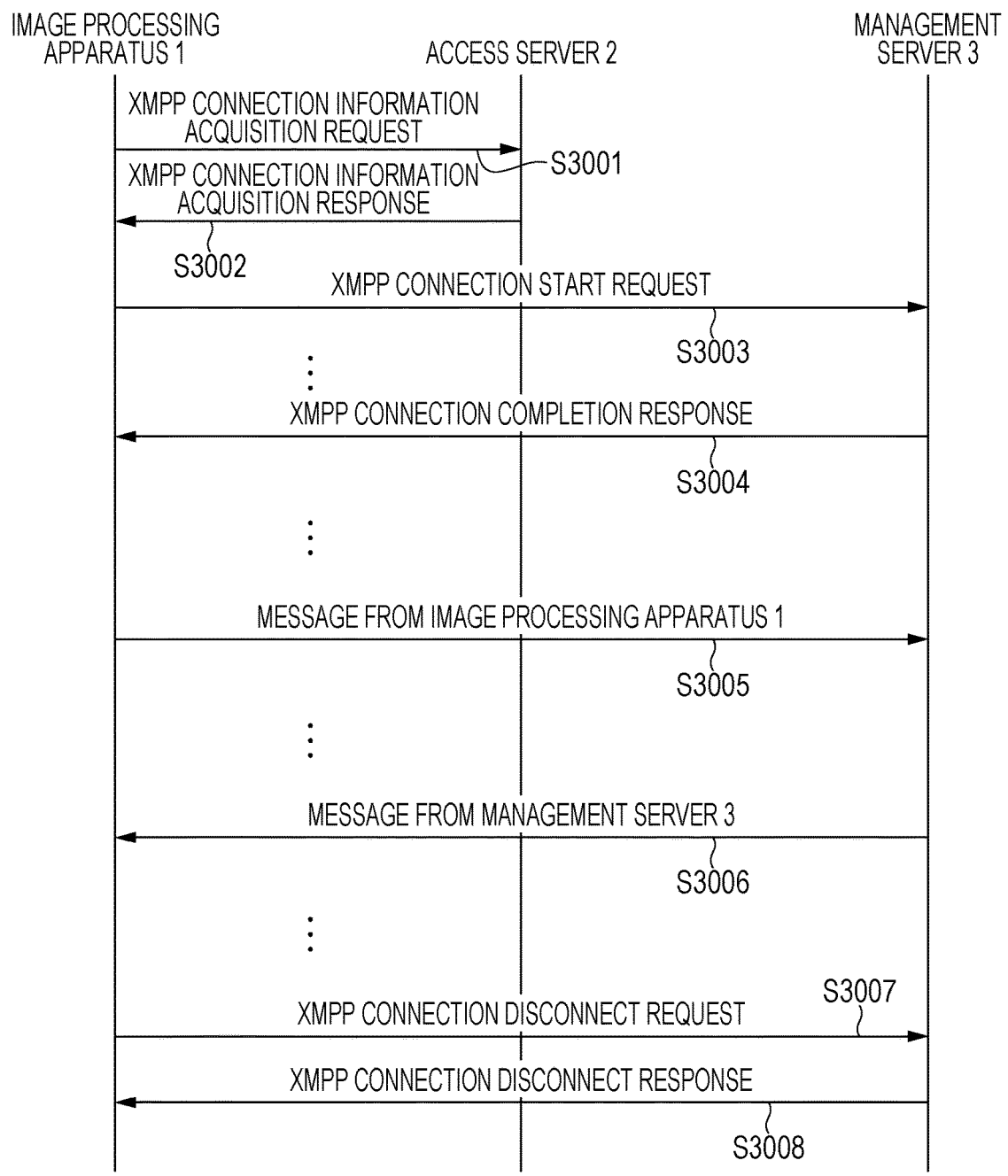
FIG. 5 is a sequence diagram illustrating an XMPP connection establishment process performed by an image processing apparatus, an access server, and a management server while communicating with each other.
Figure 6:
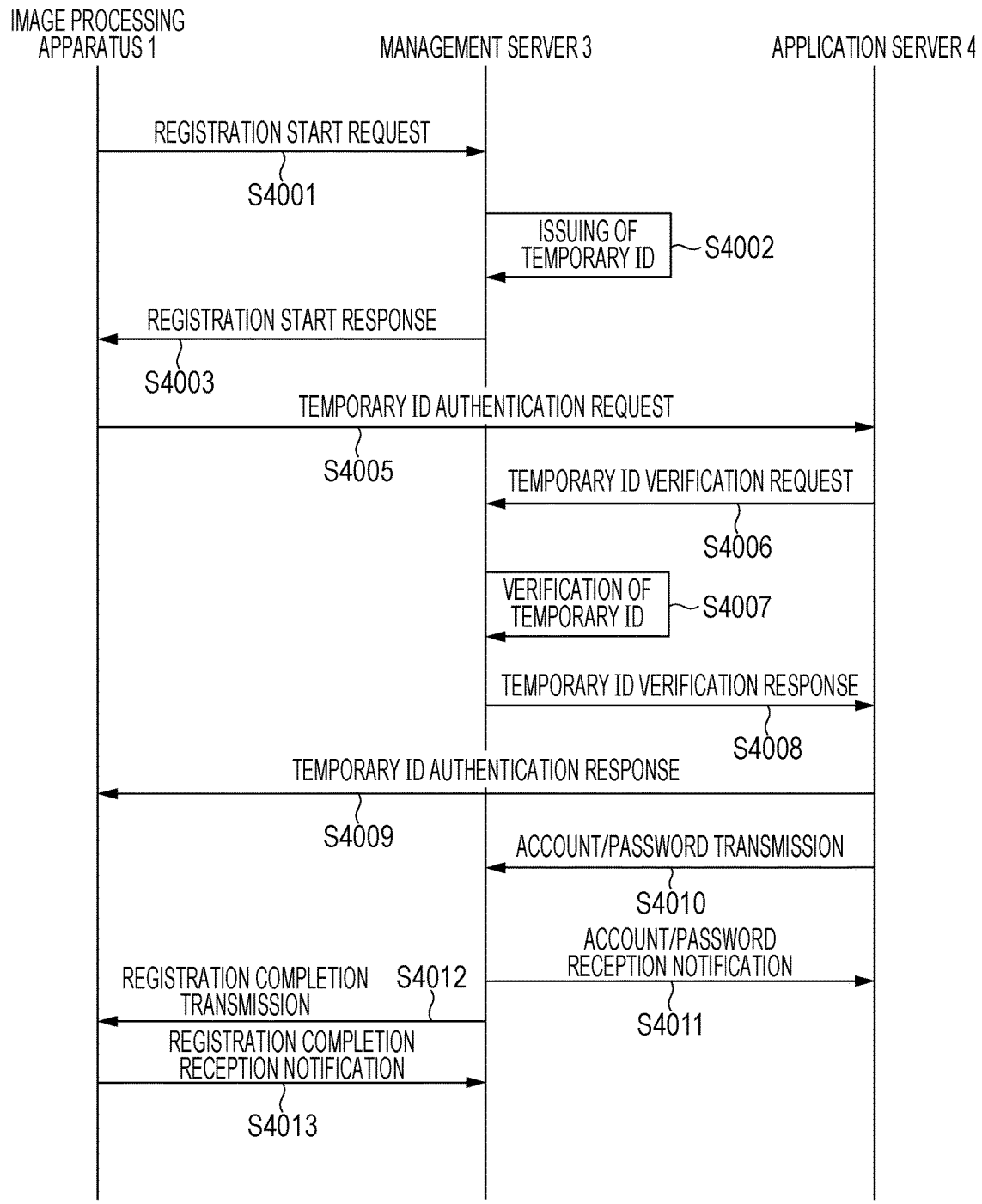
FIG. 6 is a sequence diagram illustrating a device registration process performed by an image processing apparatus and a management server while communicating with each other.
Figure 8:
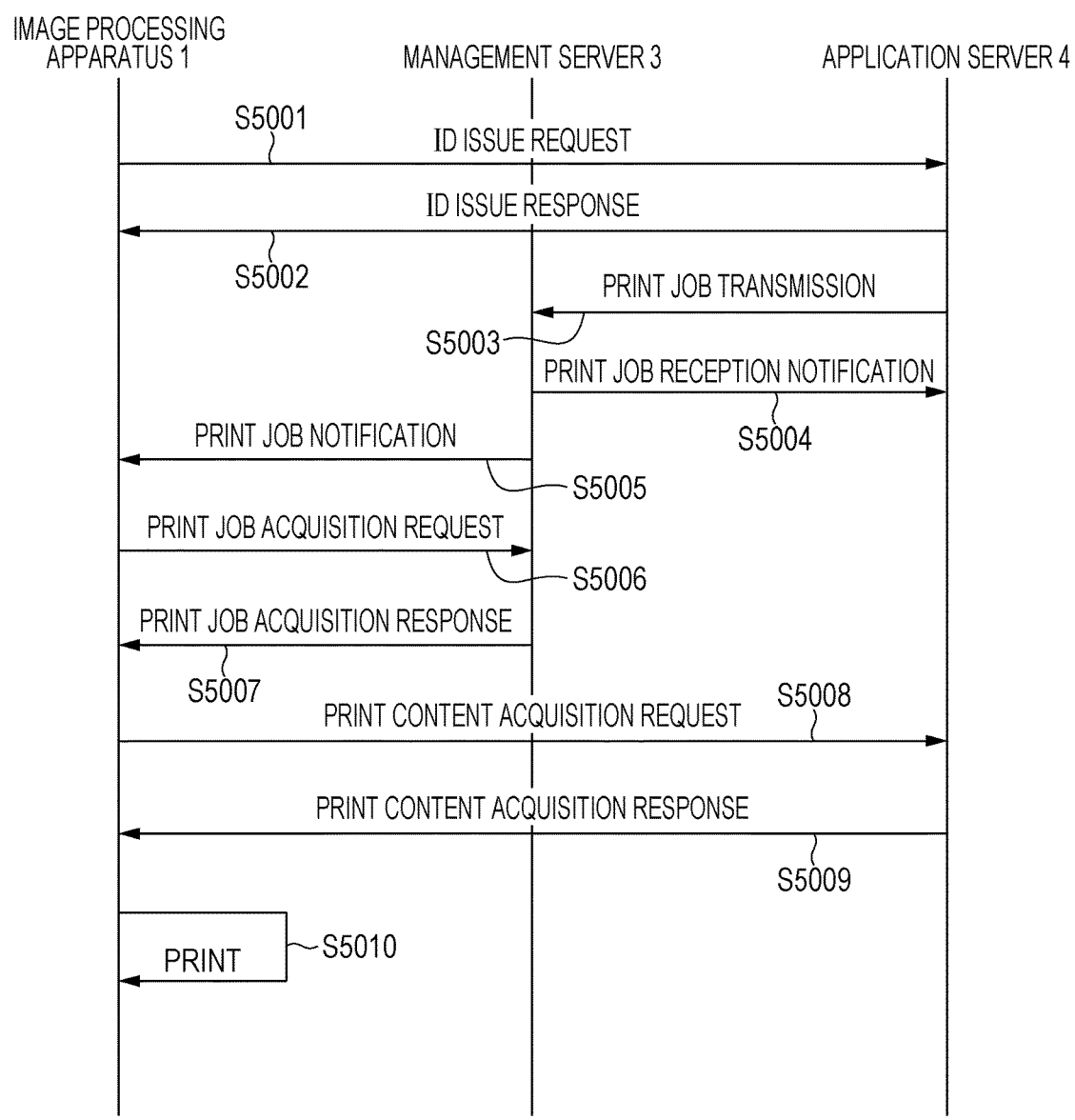
FIG. 8 is a sequence diagram illustrating a device ID issuing process performed, to add a device, by an image processing apparatus, a management server, and an application server while communicating with each other.

FIG. 5 is a sequence diagram illustrating an XMPP connection establishment process performed by the image processing apparatus 1 via a communication with the access server 2 and the management server 3. To realize a process in each step illustrated in this sequence diagram, a CPU included in each of the image processing apparatus 1, the access server 2, and the management server 3 loads a program stored in a ROM, a hard disk, or the like into a work memory such as a RAM and executes the program on the RAM. Processes in respective steps in FIG. 6 and FIG. 8 are also realized in a similar manner.

In S3001, the image processing apparatus 1 transmits, to the access server 2, using an HTTP protocol, a request for XMPP connection information. In S3002, the image processing apparatus 1 receives, from the access server 2, a response to the request issued in S3001. The reception of the response in S3002 corresponds to the acquisition of the XMPP connection information in S6000 in FIG. 4. Based on the response from the access server 2 in S3002, the image processing apparatus 1 determines, as illustrated in FIG. 4, whether to start an XMPP connection or not.

If it is determined in S3002 that the XMPP connection is to be started, then in S3003, the image processing apparatus 1 transmits an XMPP connection request to the management server 3. Thereafter, according to an XMPP connection procedure, the image processing apparatus 1 communicates with the management server 3 and establishes an XMPP connection in S3004. The establishment of the connection makes it possible to transmit and receive messages between the image processing apparatus 1 and the management server 3 in S3005 and S3006.

In a case where the XMPP connection is to be disconnected after a predetermined period of time has elapsed since the Web browser was turned off in the image processing apparatus 1, the image processing apparatus 1 requests, in S3007, the management server 3 to make the disconnection. A response to the request issued in S3007 is sent from the management server 3 and is received by the image processing apparatus 1 in S3008. On receiving the response, the image processing apparatus 1 disconnects the XMPP connection.

FIG. 6 is a sequence diagram illustrating a device registration process performed by the image processing apparatus 1 and the management server 3 while communicating with each other. The sequence illustrated in FIG. 6 is started in a state in which the XMPP connection between the image processing apparatus 1 and the management server 3 has been established via the process in S3004 illustrated in FIG. 5.

In S4001, the image processing apparatus 1 transmits a request for staring device registration to the management server 3. When the management server 3 receives the request in S4001, the management server 3 issues, in S4002, a temporary ID for device registration authentication. Next, in S4003, the management server 3 transmits, to the image processing apparatus 1, the temporary ID as a response to the request in S4001.

If the image processing apparatus 1 receives the temporary ID in S4003, then in S4005, the image processing apparatus 1 transmits a request for authentication of the temporary ID, using the HTTP protocol, to the application server 4. If the application server 4 receives the request in S4005, then in S4006, the application server 4 transmits a request for verification of the temporary ID to the management server 3. Note that requests issued in S4005 and S4006 each include the temporary ID received in S4003 by the image processing apparatus 1.

If the management server 3 receives the request in S4006, then in S4007, the management server 3 performs a verification process to verify the temporary ID included in the temporal ID verification request received in S4006 with reference to the temporary ID issued in S4002. In S4008, the management server 3 returns a result of the verification process to the application server 4. If the application server 4 receives the result in S4008, then in S4009, the application server 4 transmits, as a response to the request in S4005, an authentication result of the temporary ID to the image processing apparatus 1. Note that the authentication result includes information indicating whether the temporary ID is successfully authenticated or not. In a case where the temporary ID is not successfully authenticated, the image processing apparatus 1 displays an error message on the operation panel 15.

In a case where the response received in S4008 from the management server 3 indicates that the verification of the ID is affirmative, the application server 4 creates an account for the image processing apparatus 1. Thereafter, in S4010, the application server 4 transmits an identifier and a password of the account to the management server 3. In S4011, the management server 3 notifies the application server 4 that the identifier and the password of the account have been received in S4010. In S4012, the management server 3 transmits the identifier and the password of the account and an authentication token to the image processing apparatus 1. The image processing apparatus 1 stores the identifier and the password of the account and the authentication token in a non-volatile memory such as the ROM 12, the non-volatile memory 14, or the like. In S4013, the image processing apparatus 1 notifies the management server 3 that these pieces of information have been received.

Via the process illustrated in FIG. 6, the device registration information of the image processing apparatus 1 is stored in the management server 3. Thus, it becomes possible for the image processing apparatus 1 to use a cloud service via the application server 4.

In a case where an XMPP connection is not yet established when a user performs an operation on the operation panel 15 to start the Web browser in the image processing apparatus 1, the XMPP connection establishment process is performed. In this situation, if the device registration has not yet been made, the device registration is made via the process illustrated in FIG. 6. In a case where the Web browser is started for the first time on the image processing apparatus 1 and the service is displayed on the Web browser, a use permission is displayed and agreement confirmation is performed.

In a case where the device registration is already complete when the Web browser is started, or in a case where the device registration is made and completed when the Web browser is started, a list of applications registered in the service is displayed.

Figure 7:
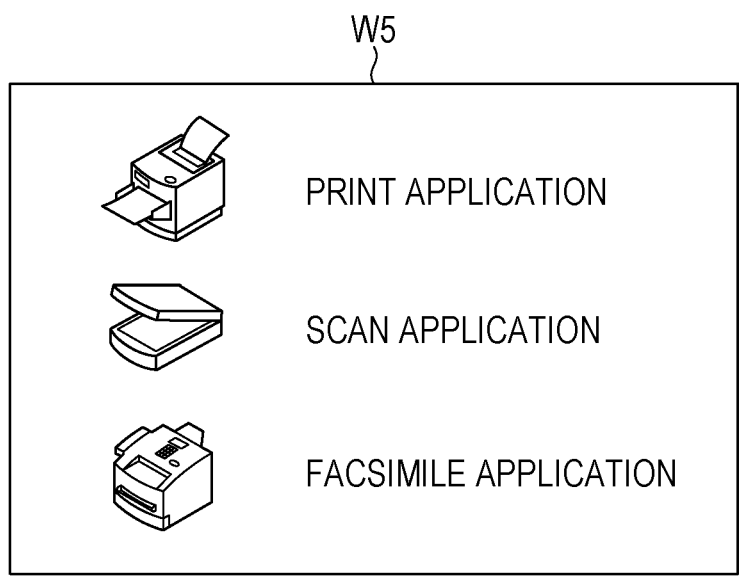
FIG. 7 illustrates an example of a display screen of an operation panel of an image processing apparatus in a state in which a Web browser is started.

FIG. 7 illustrates an example of a display screen of the operation panel 15 of the image processing apparatus 1 in a state in which the Web browser is started. In the example illustrated in this FIG. 7, the list of applications registered in the service includes a print application, a scan application, and a facsimile application. For example, a user may use the print application to create a print job via the application server 4, or may use the scan application to create a read job via the application server 4.

As described above, by completing the device registration via the process illustrated in FIG. 6, it becomes possible for a user of the image processing apparatus 1 to issue a job via the application server 4 by operating the operation panel 15 of the image processing apparatus 1. However, in a state in which only the process illustrated FIG. 6 is performed, associative registration information indicating the association between the image processing apparatus 1 and the user account is not stored in the application server 4. Therefore, it is not allowed to issue a job from the remote terminal 5 to the image processing apparatus 1. To handle the situation described above, a device addition may be performed in a process illustrated in FIG. 8, and the image processing apparatus 1 and the user account may be associated in the application server 4.

FIG. 8 is a sequence diagram illustrating a device ID issuing process for the device addition performed by the image processing apparatus 1 while communicating with the management server 3 and the application server 4. It is assumed here that the image processing apparatus 1 is in a state in which the XMPP connection to the management server 3 has been established via the process from S3001 to S3004 in FIG. 5.

In S5001, the image processing apparatus 1 transmits a device ID issue request to the application server 4 using an HTTP protocol. If the application server 4 receives the request in S5001, then in S5002, the application server 4 transmits a response to the image processing apparatus 1 to notify that the request has been received. If the image processing apparatus 1 receives, in S5002, the response from the application server 4, the image processing apparatus 1 waits for a notification of a print job or a read job to be received.

If the application server 4 accepts an ID issue request in S5001, the application server 4 produces a print content corresponding to the device ID and issues a print job instructing that this content is to be printed. Thereafter, in S5003, the application server 4 transmits this print job to the management server 3 using an HTTP protocol. When the management server 3 accepts the print job in S5003, the management server 3 notifies the application server 4 that the print job has been received. Furthermore, in S5005, the application server 4 notifies, using XMPP, the image processing apparatus 1 of the existence of the print job. Note that this notification does not include the actual print content, but includes information indicating that the print job has been issued.

When the image processing apparatus 1 receives the notification of the print job in S5005, the image processing apparatus 1 transmits, in S5006, using an XMPP protocol, a request for acquisition of job information to the management server 3. When the management server 3 accepts the request in S5006, the management server 3 sends, in S5007, job information using XMPP to the image processing apparatus 1. This job information also does not include the print content, but the job information includes a print content URL which is location information indicating a location where the print content is stored. In the present embodiment, the print content is stored in the application server 4, and the print content URL indicates a storage are, in the application server 4, where the print content to be processed is stored.

After the image processing apparatus 1 acquires the job information in S5007, the image processing apparatus 1 advances the sequence to S5008 in which the image processing apparatus 1 establishes an HTTP connection to the application server 4 corresponding to the print content URL included in the job information. The image processing apparatus 1 then requests, via the connection established according to HTTP, the application server 4 to provide the print content which is data to be processed. When the application server 4 accepts the request in S5008, then in S5009, the application server 4 transmits, using HTTP, the print content to be processed to the image processing apparatus 1. When the image processing apparatus 1 receives the print content, the image processing apparatus 1 prints the print content in S5010. Note that when the reception of the print content in S5009 is completed, the connection between the image processing apparatus 1 and the application server 4 is disconnected.

Note that the application server 4 creates a URL unique to the device ID issued in response to the request received in S5001. This URL is a URL of a Web page that is provided, by the application server 4, for the device addition procedure. The print content includes the device ID and the URL of this authentication Web page. In S5010, the URL uniquely issued to the image processing apparatus 1 is printed.

A user may access, using a Web browser on a terminal such as a PC, a smartphone, or the like, to the URL included in the print content printed, by the image processing apparatus 1, in the device ID issuing sequence illustrated in FIG. 8. In response, a login screen for login to a user account of the service is displayed.

Figure 9:
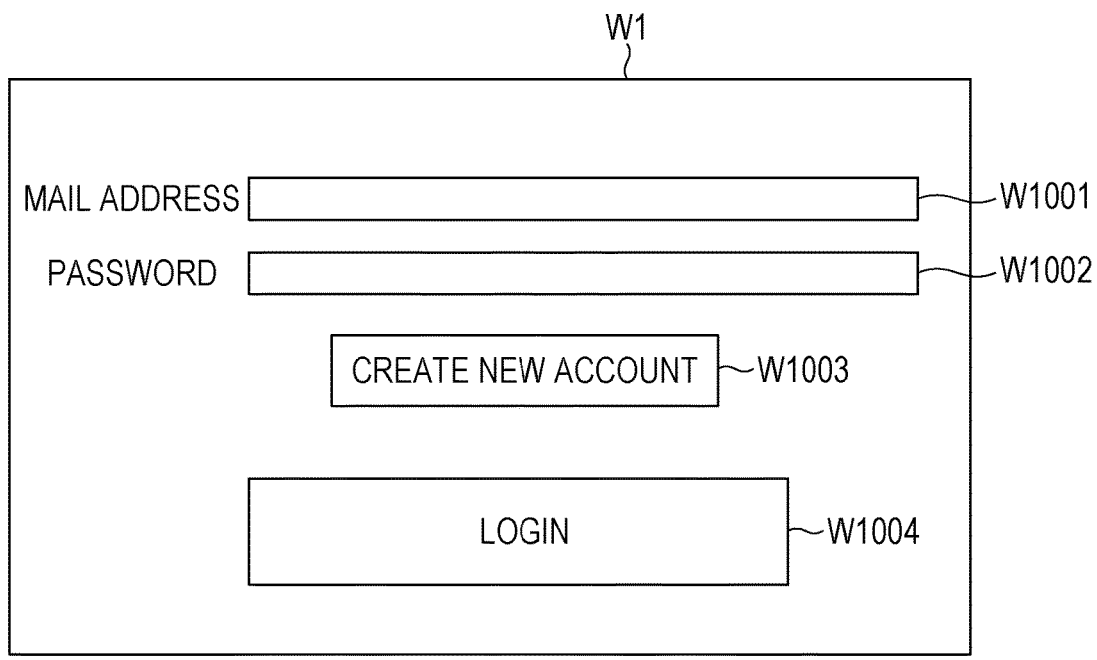
FIG. 9 is a diagram illustrating an example of a login screen.

FIG. 9 is a diagram illustrating an example of a login screen. The screen W1 includes a mail address input box W1001, a password input box W1002, a new account creation button W1003, and a login button W1004. In the present example, it is assumed by way of example that a mail address of a user is used as an identifier of a user account.

To make login, a user may input his/her mail address and password and press the login button W1004. In a case where the user does not yet have his/her account, the user may press the new account creation button W1003 to create his/her account.

Figure 10:
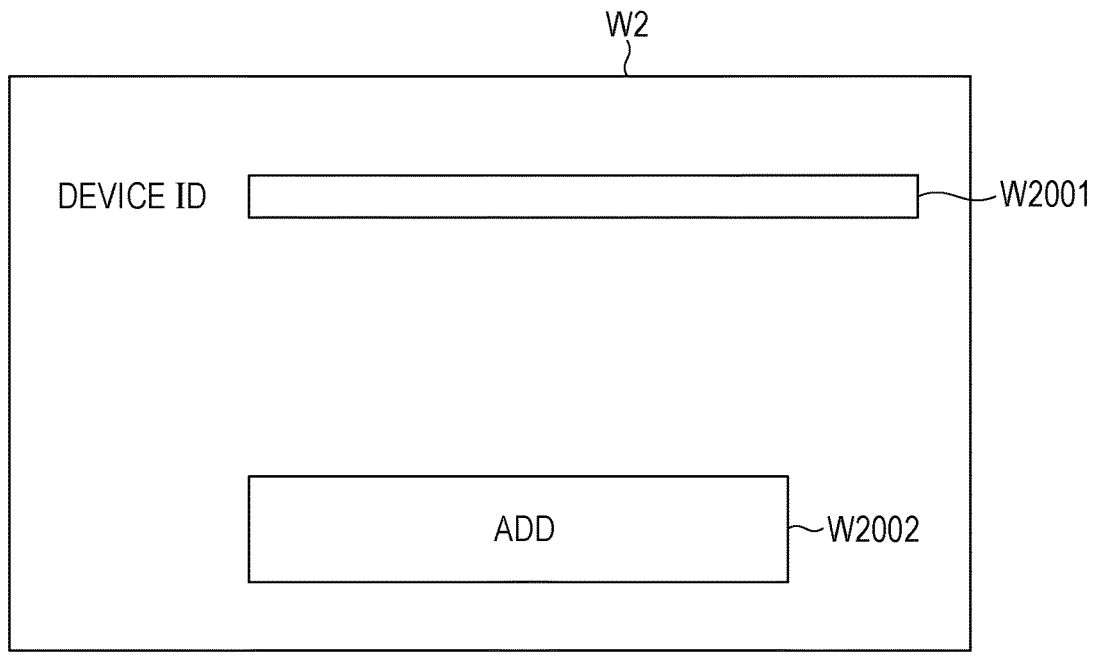
FIG. 10 is a diagram illustrating an example of a device addition screen.

FIG. 10 is a diagram illustrating an example of a device addition screen, which is displayed when login is made. In FIG. 10, a screen W2 includes a device ID input box W2001, and an add button W2002. The user may input, in the device ID input box W2001, the device ID included in the print content printed in S5010 in FIG. 8 and may press the add button W2002. When the add button W2002 is pressed, the input device ID is transmitted to the application server 4. When the application server 4 receives the device ID, the application server 4 registers the user account and the image processing apparatus 1 in association with each other, and stores them in a database. When the associative registration is completed, the application server 4 notifies the management server 3 of the completion of the associative registration.

After the associative registration is completed, the user can login, as the user associated with the device ID of the image processing apparatus 1, to the image processing by accessing to the application server 4 from the remote terminal 5 and inputting the mail address and the password described above. Thus, thus this user is allowed to transmit, using the remote terminal 5, the print job to the image processing apparatus 1 via the application server 4 and the management server 3.

In a case where after the device addition is performed, the remote terminal 5 requests the application server 4 to issue a job as in the example described above, the request by the remote terminal 5 is performed using HTTP. More specifically, the request includes information specifying an image to be printed. The application server 4 sends, to the management server 3, the print job including the image processing apparatus 1 registered in association with the user account used in the login by the remote terminal 5. By performing the following process in a similar manner to the process in S5003 to S5010 in FIG. 8, it is possible to print, by the image processing apparatus 1, the image specified by the remote terminal 5. In S5005, the management server 3 notifies the image processing apparatus 1 of the print job using XMPP. Therefore, in order to allow the image processing apparatus 1 to receive the print job, the XMPP connection with the management server 3 is necessary.

Note that in the process illustrated in FIG. 4, when the power of the image processing apparatus 1 is turned on, the image processing apparatus 1 sends an inquiry, using HTTP, to the management server 3 as to whether there is a job. In response to the inquiry, the management server 3 sends a notification, using HTTP, to the image processing apparatus 1 as to whether there is a job in a similar manner to the process in S5003. In a case where a notification indicating that there is a job is received using HTTP from the management server 3, the image processing apparatus 1 executes printing in a similar manner to the process from S5004 to S5010.

In a case where a request for issuing of a print job is issued via the operation panel 15 of the image processing apparatus 1, a request for printing is sent, using HTTP, to the application server 4 in a similar manner to the case in which the request is issued from the remote terminal 5. The request is similar to that issued from the remote terminal 5. Thus, the application server 4 and the management server 3 do not need to change the process depending on whether the job is issued from the image processing apparatus 1 or another apparatus (the remote terminal 5 or the like). Thus, in either case, it is possible to make the image processing apparatus 1 execute a job via the same process. As described above, also in the case where a request for issuing a print job is issued by the image processing apparatus 1, a notification of the print job is sent using XMPP from the management server 3 to the image processing apparatus 1. However, in the case where a request for issuing a print job is issued by the image processing apparatus 1, unlike the case where a request is issued by the remote terminal 5, the timing of establishing an XMPP connection may be when a user operates the operation panel 15 to issue the request.

Note that when the management server 3 receives a notification of the completion of associative registration, the management server 3 stores, as always-on connection information, information indicating that the always-on connection is necessary. In this case, in S6001 in FIG. 4, the image processing apparatus 1 acquires the XMPP connection information indicating that the always-on connection is necessary. On the other hand, in a state in which the device addition (the association between the image processing apparatus 1 and the user account) has not been performed, the management server 3 stores, as the always-on connection information, information indicating the always-on connection is not necessary.

Thus, in a case where the device addition has already been performed in the S6004 in FIG. 4, and there is a possibility that the image processing apparatus 1 receives a job from the remote terminal 5, the XMPP connection to the management server 3 is started when the power is turned on. This is because when the associative registration is completed, it becomes possible to generate a job by accessing the application server 4 from the remote terminal 5, and thus there is a possibility that the image processing apparatus 1 receives a job notification at an unknown point of time.

Furthermore, it becomes possible to prevent the always-on XMPP connection to the management server 3 from being established when the power is turned on in a situation in which the device addition has not been performed and thus there is no possibility that a job is issued by operating an external apparatus such as the remote terminal 5.

Figure 11:
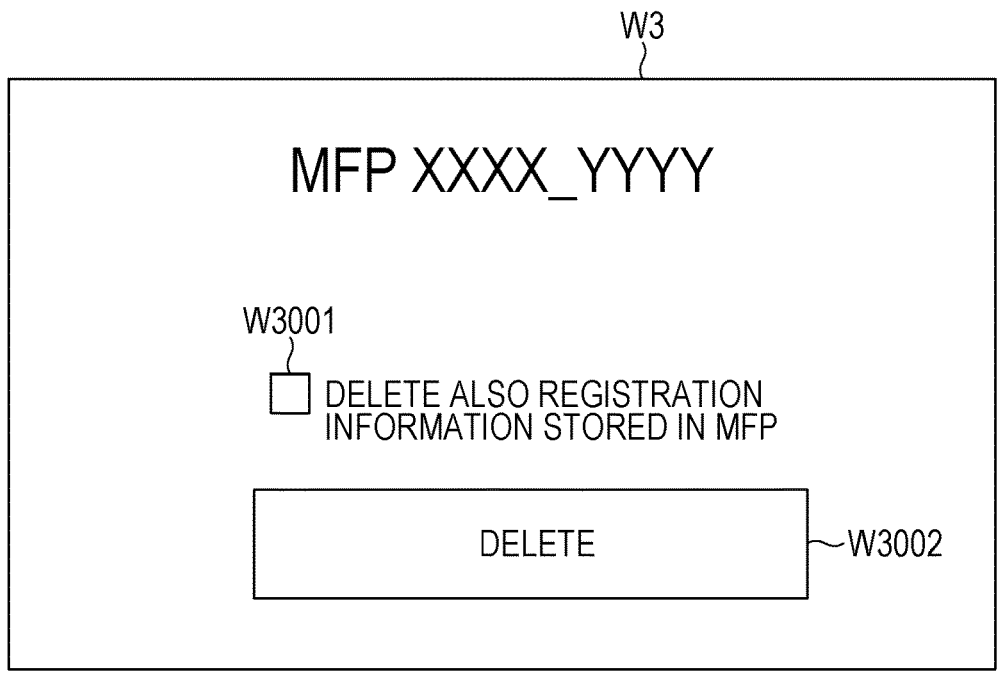
FIG. 11 is a diagram illustrating an example of a printer delete pate.

Furthermore, when there is a printer that has been added in the manner illustrated in FIG. 10, it is possible to delete the printer from a group of printers usable to execute jobs by operating the remote terminal 5. FIG. 11 is a diagram illustrating an example of a printer delete screen. When a user accesses a Web page for deleting a printer, and inputs a mail address and a password, the printer delete Web page illustrated in FIG. 11 is displayed.

Note that the printer delete Web page illustrated in FIG. 11 is merely an example. In FIG. 11, a screen W3 includes a check box W3001 for specifying whether information stored in the image processing apparatus 1 is to be deleted or not, and a delete button W3002. In according to inputting on the screen W3 given by a user, the application server 4 deletes the association information between the user account of this user and the device ID of the image processing apparatus 1. In a case where the check box W3001 is checked, not only the association information but also device registration information of the image processing apparatus 1 is deleted.

When a user presses the delete button W3002, a notification of the deletion of the printer is sent, together with information indicating whether the check box W3001 is checked or note, to the application server 4. When the application server 4 receives the notification, the application server 4 updates the information stored in the database such that the association information indicating the association between the user account and the device ID is invalidated, and the application server 4 notifies the management server 3 that the update is completed. When the management server 3 receives the notification, the management server 3 sends the notification to the image processing apparatus 1.

In the case where the check box W3001 is checked, the application server 4 notifies the management server 3 that the device registration information has been deleted, while in the case where the check box W3001 is not checked, the application server 4 notifies the management server 3 that the always-on connection is not necessary. The reason why this notification is sent in the above-described manner is that the deleting of the associative registration results in no possibility that a job is generated by operating the remote terminal 5, and producing of a job is allowed only by operating the image processing apparatus 1. Therefore, in this case, in the judgment process in S6004 in FIG. 4, the image processing apparatus determines that the always-on connection is not necessary.

Figure 12:
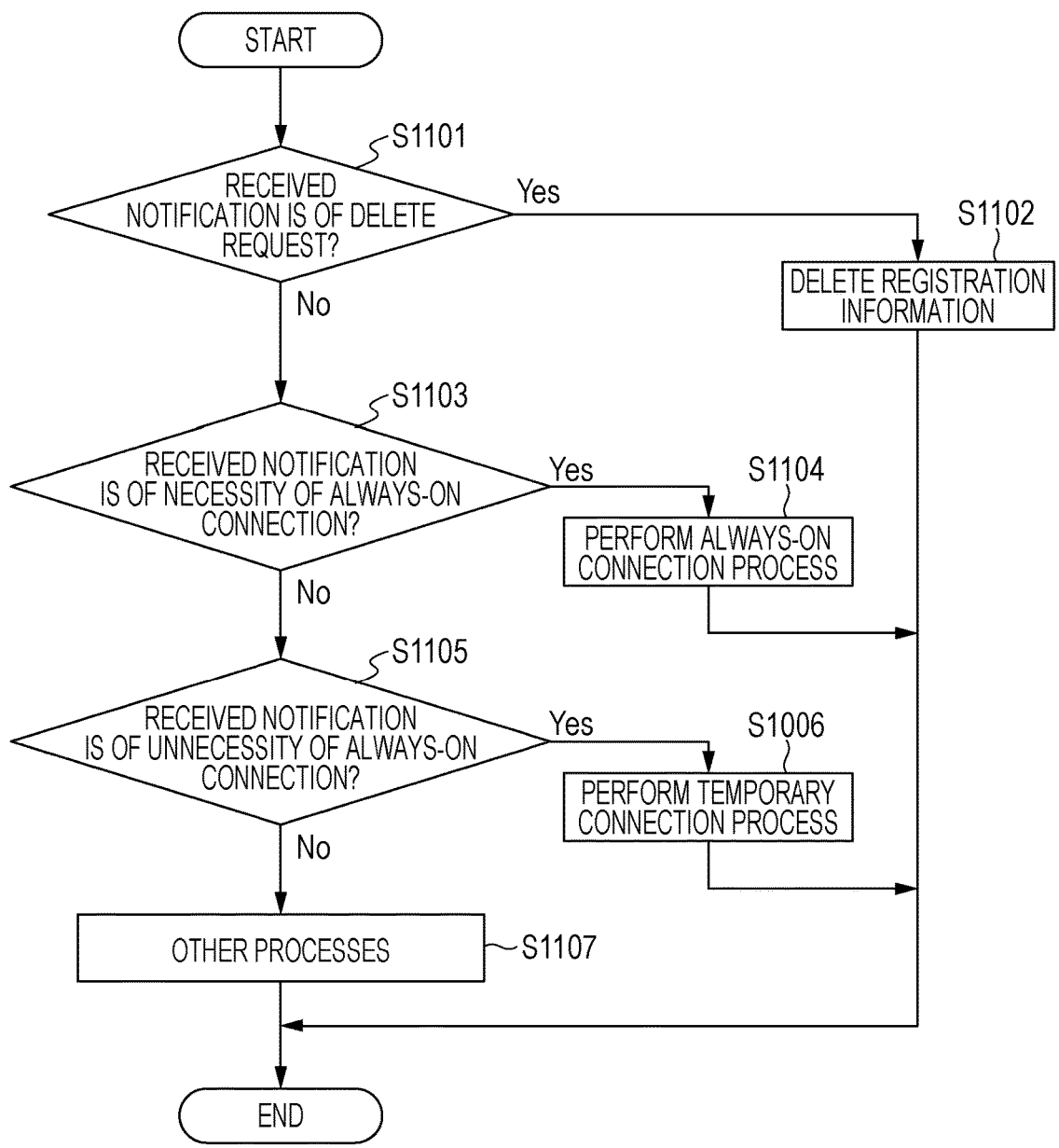
FIG. 12 is a flow chart illustrating a process performed by an image processing apparatus when the image processing apparatus receives a notification message from a management server.

FIG. 12 is a flow chart illustrating a process performed by the image processing apparatus 1 when the image processing apparatus 1 receives a notification message from the management server 3. The process illustrated in the flow chart of FIG. 12 is realized by the CPU 11 by loading a program stored in the ROM 12 into the RAM 13 and executing the program on the RAM 13.

When the image processing apparatus 1 receives a notification, then in S1101, the CPU 11 determines whether this notification is a deletion notification or not. When the notification is a deletion notification, then in S1102, the CPU 11 deletes the device registration information stored in the non-volatile memory and disconnects the XMPP connection with the management server 3.

In S1103, the CPU 11 determines whether the notification is a notification of necessity of the always-on connection. When the notification indicates the necessity of the always-on connection, then in S1104, the CPU 11 performs an always-on connection establishment process. In the always-on connection establishment process, the CPU 11 stops a disconnection timer and keeps the XMPP connection.

In S1105, a determination is performed as to whether the notification is a notification of unnecessity of the always-on connection. When the notification indicates unnecessity, then in S1106, a temporary connection establishment process is performed. In the temporary connection establishment process, the disconnection timer is started, and the XMPP connection is disconnected when a particular time has elapsed. There is a possibility that a delay in arrival time occurs for a job generated when the always-on connection is kept, and thus the connection may be kept for a predetermined period of time after the disconnection. In a case where another notification is received, the CPU 11 performs another process in S1107.

Note that even in a state in which there is no associative registration for a combination of the image processing apparatus 1 and the user account, for example, there is a possibility that use of automatic printing service for the image processing apparatus 1 is registered in the application server 4. The automatic printing service is a service in which information about news, a weather forecast, or the like is transmitted to the image processing apparatus 1 at each predetermined time and printed by the image processing apparatus 1. In the automatic printing service, it is necessary to allow a print job to be issued regardless of whether the image processing apparatus 1 is operated or not, and thus it is necessary for the image processing apparatus 1 to be always connected, by XMPP, to the management server 3.

In the present embodiment, in view of the above, in a case where the image processing apparatus 1 is registered, as an apparatus subscribing to the automatic printing service, in the application server 4, the image processing apparatus 1 is also always connected to the management server 3.

Figure 13:
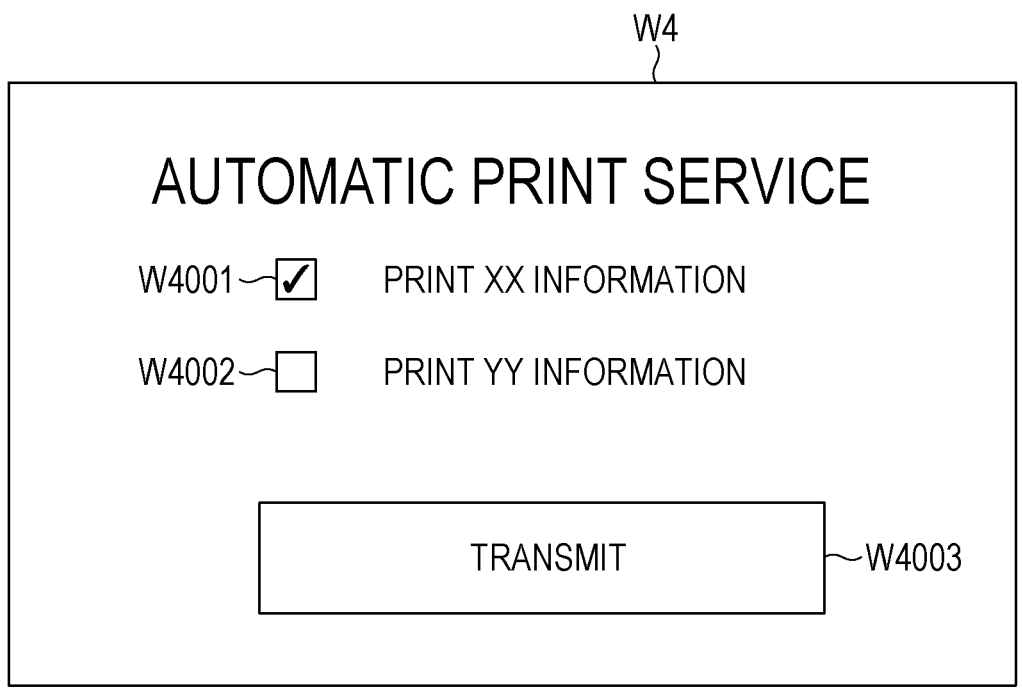
FIG. 13 is a diagram illustrating an example of a screen for registering an automatic printing service.

FIG. 13 is a diagram illustrating an example of an automatic printing service registration screen. This is one of services that are displayed on a built-in Web browser when the operation panel of the image processing apparatus 1 is operated. A check box W4001 and a check box W4002 are for selecting information to be printed by the automatic printing service. When a user presses a transmit button W4003, information indicating the device ID of the image processing apparatus 1 and information indicating the states of the check boxes are transmitted to the application server 4. When the application server 4 receives the information, the application server 4 registers, in a database, the device ID of the image processing apparatus 1 to which the automatic printing service is to be provided. Note that information to be supplied by the automatic printing service is also registered in the database according to the states of the check boxes.

In this case, always-on connection information indicating that the always-on connection is necessary is sent from the application server 4 to the management server 3. Thus, in a case where use of the automatic printing service is registered, the always-on XMPP connection is applied to the image processing apparatus 1 via the process illustrated in FIG. 4. In a case where the device addition (the associative registration) is not performed and use of the automatic printing service is not registered, the management server 3 stores information indicating that the always-on connection is not necessary. In a case where any check box in FIG. 13 is not checked, information indicating that the always-on connection is not necessary is sent from the application server 4 to the management server 3.

Services that need the always-on connection between the image processing apparatus 1 and the management server 3 have been described above. However, these are merely examples and applying of the always-on connection is not limited to these services. In a case there are a plurality of services that need the always-on connection, if any one of these services is registered, the always-on connection is necessary, but the always-on connection is not necessary in a case where any of these services is not registered.

In the present embodiment, as described above, the image processing apparatus 1 is connected to the management server 3 via the always-on XMPP connection in some cases, but the always-on XMPP connection is not established in some cases. However, in a case where it is necessary to notify the external service 6 of the status information of the image processing apparatus 1, the image processing apparatus 1 needs to be always capable of transmitting a status notification in response to a change in status of the image processing apparatus. In view of the above, to make it possible to transmit a status notification even in a state in which the XMPP connection is not established, HTTP may be used for the status notification transmission as described below. Detailed description thereof is given below for each of following two cases: a case in which an always-on XMPP connection has already been established; and a case in which an always-on XMPP connection is not yet established.

Figure 14A:
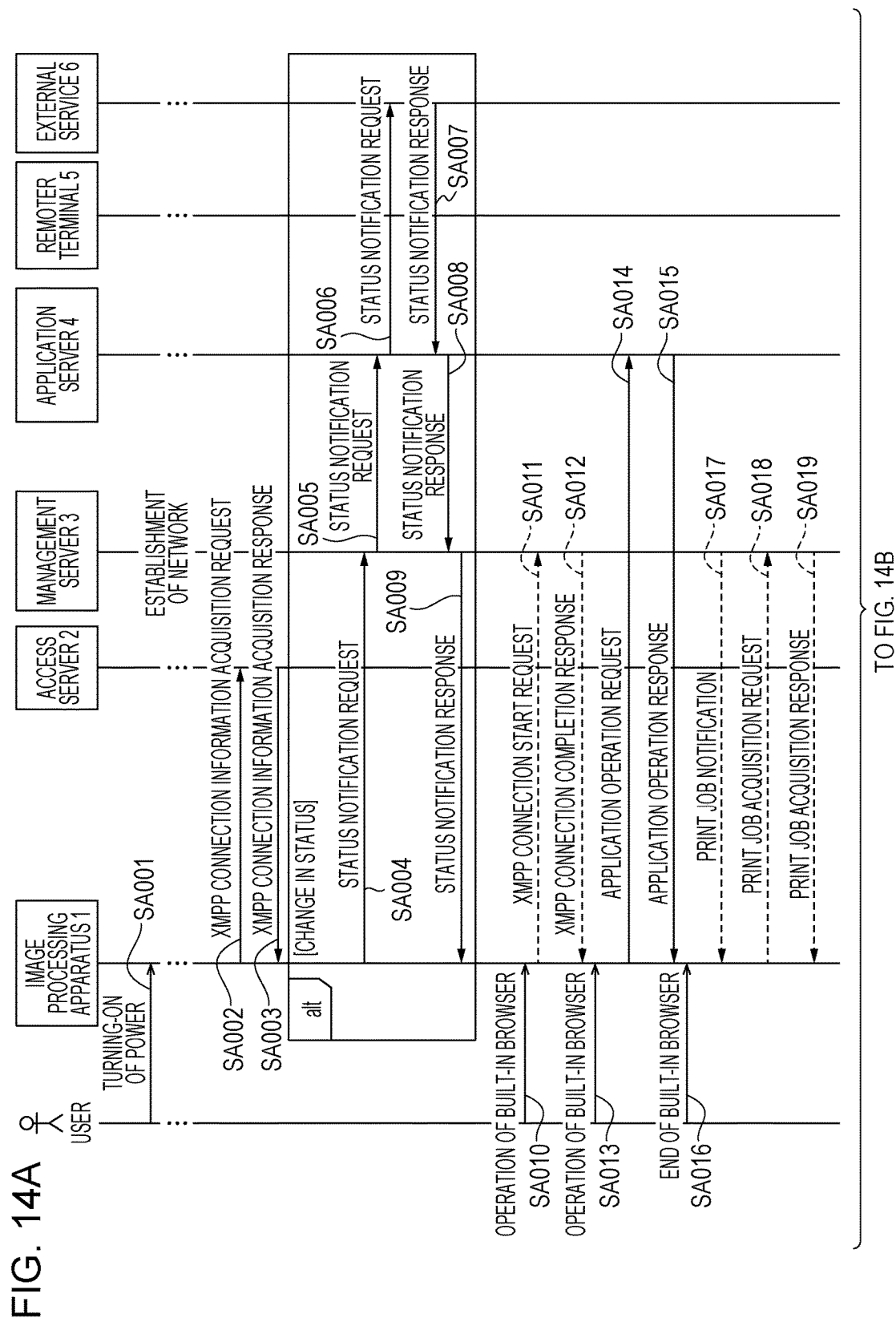
FIGS. 14A and 14B respectively illustrate first and second parts of a sequence diagram of a status notification process performed by an image processing apparatus and servers while communicating with each other via a connection that is established temporarily as required.
Figure 14B:
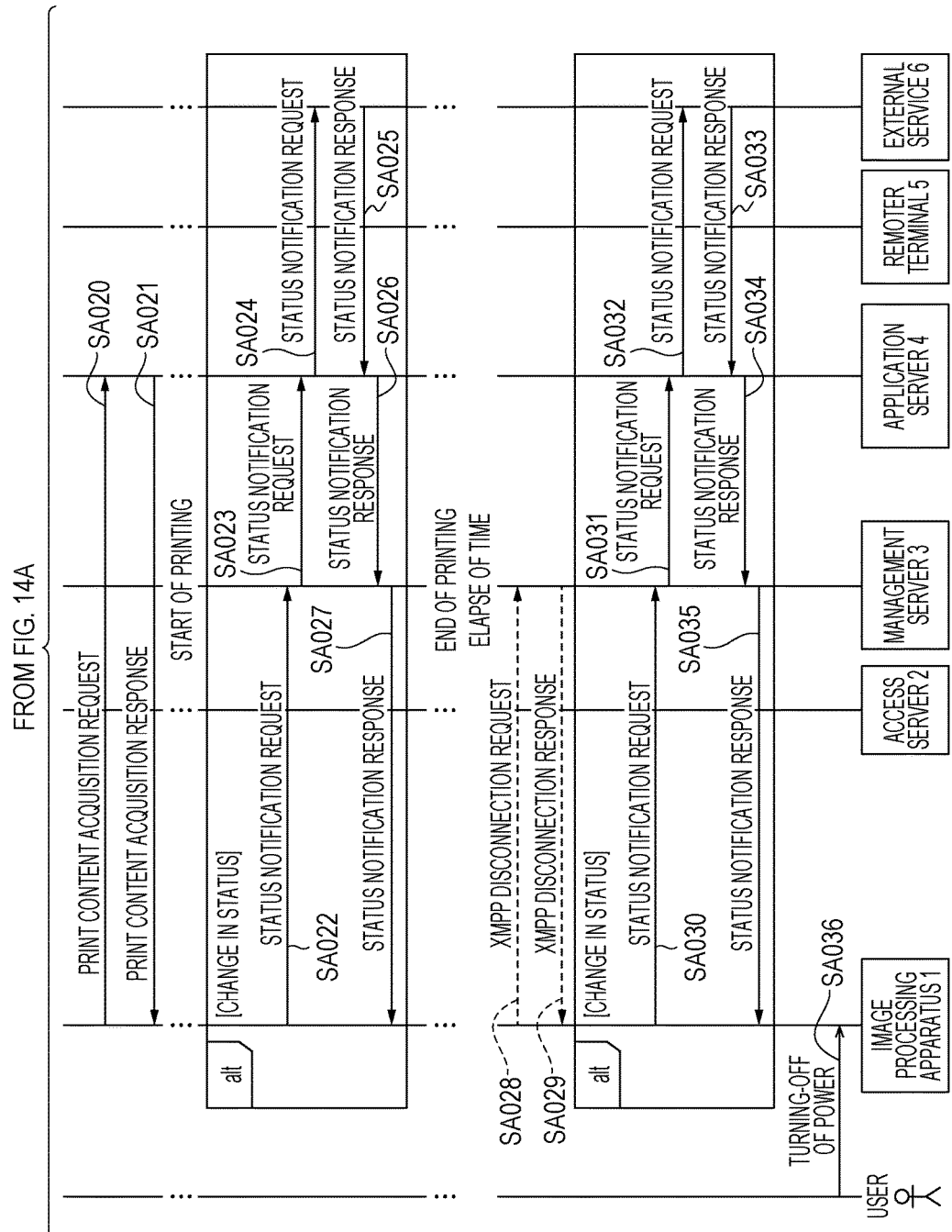

FIGS. 14A and 14B respectively illustrate first and second parts of a sequence diagram of a status notification process performed by the image processing apparatus 1 and servers while communicating with each other via a connection that is established temporarily as required.

In SA001, a user turns on a power of the image processing apparatus 1. As a result, the communication interface 18 is activated and a network is established between the image processing apparatus 1 and the access server 2 such that communication is possible between the image processing apparatus 1 and the access server 2. When it becomes possible for the image processing apparatus 1 to communicate with the access server 2, then, in SA002, the image processing apparatus 1 transmits an XMPP connection information acquisition request, using an HTTP protocol, to the access server 2. In SA003, the image processing apparatus 1 receives, from the access server 2, a response to the request issued in SA002. The reception in SA003 corresponds to acquisition of XMPP connection information in S6001 in FIG. 4. According to the response in SA003 from the access server 2, a determination is made, as illustrated in FIG. 4, as to whether an XMPP connection is started or not. In the example of the sequence in FIGS. 14A and 14B, the XMPP connection is not started.

In SA004, the image processing apparatus 1 transmits a status notification request, using an HTTP protocol, to the management server 3. The status notification request includes status information of the image processing apparatus 1. Note that the transmission of the status notification request is performed when a particular status change occurs in the image processing apparatus 1. More specifically, for example, when an error such as an ink-low error, a no-ink error, a no-sheet error, a jam error, or the like occurs in the image processing apparatus 1, a status notification request including status information indicating the error is transmitted. For example, a status change such as a start of printing, an end of printing, or the like occurs, a status notification request including status information indicating the status change is transmitted. Other examples of status changes include opening of a cover of a document plate, opening of a cover to exchange an ink tank, and exchanging of an ink tank. When such a status change occurs, a status notification request including status information indicating the status change is also transmitted. In the present embodiment, when a status notification request is transmitted in other situations described below, the status notification request including status information indicating a status change owing to some of similar causes is transmitted.

In SA005, the management server 3 transmits a status notification request, using an HTTP protocol, to the application server 4. In SA006, the application server 4 transmits a status notification request, using an HTTP protocol, to the external service 6. In SA007, the external service 6 transmits a status notification response, using an HTTP protocol, to the application server 4. In SA008, the application server 4 transmits a status notification response, using an HTTP protocol, to the management server 3. In SA009, the management server 3 transmits a status notification response to the image processing apparatus 1.

In SA010, a user starts a Web browser installed in the image processing apparatus 1. When the built-in Web browser is started, the image processing apparatus 1 transmits an XMPP connection start request to the management server 3 in SA011. In SA012, the image processing apparatus 1 receives a response thereto. Thus, the XMPP connection is started. After this, until the XMPP connection is disconnected, it is possible to perform a communication using an XMPP protocol.

In SA013, the user operates the built-in Web browser. In response to the operation, the image processing apparatus 1 transmits an application operation request, using an HTTP protocol, to the application server 4 in SA014. In SA015, the image processing apparatus 1 receives a response, using an HTTP protocol, from the application server 4. In this process, a print job generation command is issued to the application server 4. In SA016, the user ends the built-in Web browser.

When a job is generated in response to the print job generation command, then in SA017, the image processing apparatus 1 receives a job notification using an XMPP protocol. When the image processing apparatus 1 receives the job notification, the image processing apparatus 1 transmits, in SA018, a print job acquisition request using an XMPP protocol to the management server 3. In SA019, the image processing apparatus 1 receives a response thereto from the management server 3. When the image processing apparatus 1 receives the print job, the image processing apparatus 1 transmits a print content acquisition request to the application server 4 in SA020. In SA021, the image processing apparatus 1 receives a response to this request from the application server 4. When the image processing apparatus 1 receives a print content, the image processing apparatus 1 prints the content.

When a change in status occurs during the printing operation, the image processing apparatus 1 issues a status notification. Similarly, in SA022 to SA027, notifications using HTTP protocols are issued.

When a particular period of time has elapsed since the end of the printing, the image processing apparatus 1 transmits an XMPP disconnect request to the management server 3 in SA028, and receives a response thereto from the management server 3 in SA029. Thus, the XMPP connection is disconnected.

After the XMPP connection is disconnected in SA029, when a status change occurs, the image processing apparatus 1 sends a status notification using an HTTP protocol for example, in SA030 to SA035 in a similar manner to SA004 to SA009.

When the user turns off the power of the image processing apparatus 1 in SA031, the process by the image processing apparatus 1 is ended.

In the example described above, the status notifications are transmitted using the HTTP protocols. However, in a case in which the XMPP connection is available, an XMPP protocol may be used.

Figure 15B:
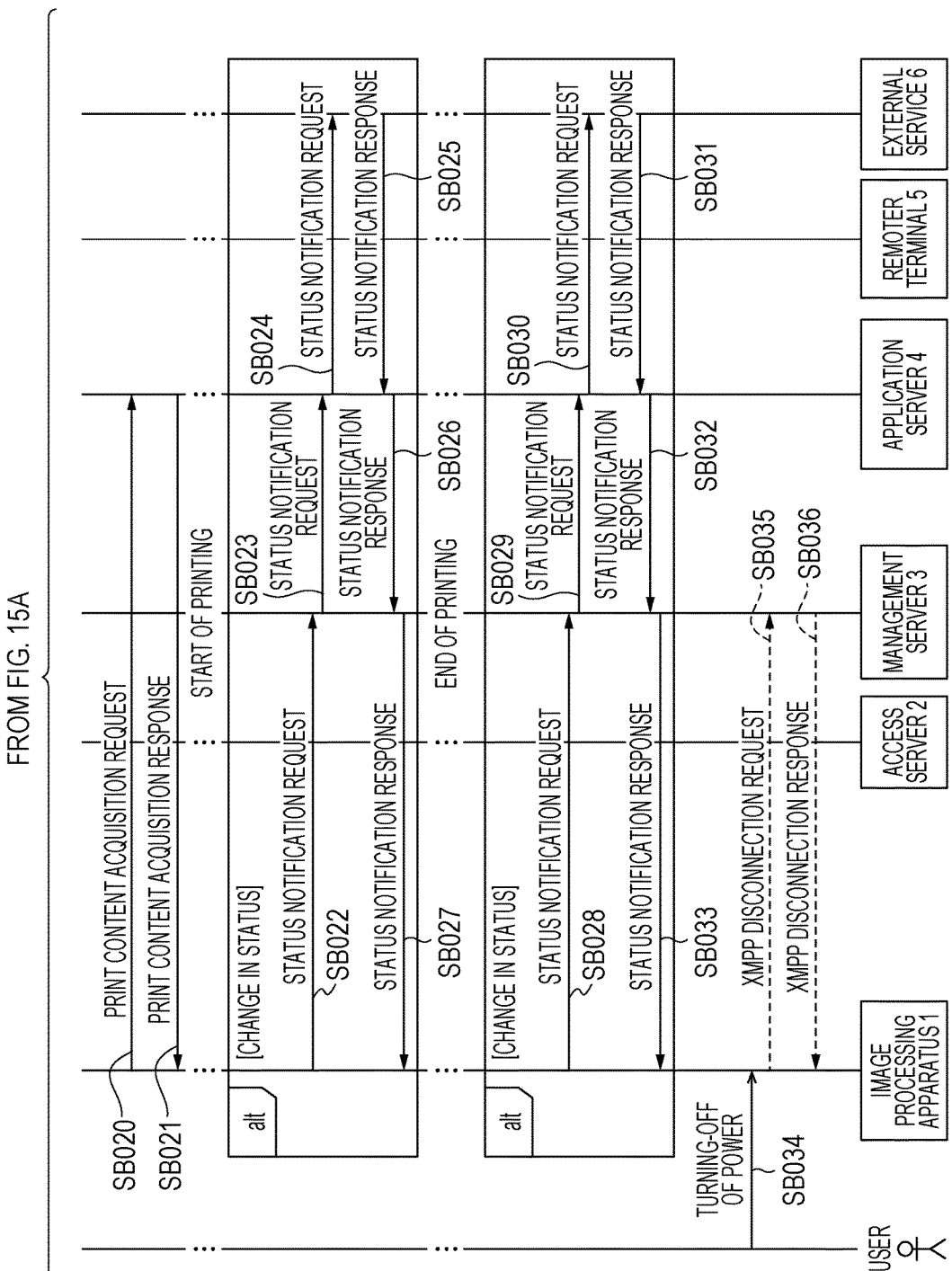

FIGS. 15A and 15B respectively illustrate first and second parts of a sequence diagram of a status notification process performed by the image processing apparatus 1 and a server while communicating with each other via an always-on connection.

In SB001, a user turns on the power of the image processing apparatus 1. As a result, the communication interface 18 is activated and a network is established between the image processing apparatus 1 and the access server 2 such that communication is possible between the image processing apparatus 1 and the access server 2. When the communication becomes possible, the image processing apparatus 1 transmits, in SB002, an XMPP connection information acquisition request using an HTTP protocol to the access server 2. In SB003, the image processing apparatus 1 receives, from the access server 2, a response to the request issued in SB002. The reception in SB003 corresponds to acquisition of XMPP connection information in S6001 in FIG. 4. According to the response in SB003 from the access server 2, a determination is made, as illustrated in FIG. 4, as to whether the XMPP connection is to be started or not. In the example of the sequence in FIGS. 15A and 15B, the XMPP connection is started.

The image processing apparatus 1 transmits an XMPP connection start request to the management server 3 in SB004, and receives a response thereto from the management server 3 in SB005. Thus, the XMPP connection is started. After this, until the XMPP connection is disconnected, it is possible to perform a communication using an XMPP protocol.

When a status change occurs, the image processing apparatus 1 sends a status notification using an HTTP protocol in SB006 to SB011 in a similar manner as illustrated in FIGS. 14A and 14B.

In SB012, the user starts a Web browser on the remote terminal 5. When the Web browser is started, then in SB013, the user operates the Web browser. In response to the operation, in SB014, the remote terminal 5 transmits an application operation request using an HTTP protocol to the application server 4. In SB015, the remote terminal 5 receives a response from the application server 4. In this process, a print job generation command is issued to the application server 4. In SB016, the user ends the built-in Web browser.

When a print job is generated according to the print job generation command, then in SB017, the image processing apparatus 1 receives a job notification using an XMPP protocol. When the image processing apparatus 1 receives the job notification, then in SB018, the image processing apparatus 1 transmits a print job acquisition request using an XMPP protocol to the management server 3. In SB019, the image processing apparatus 1 receives a response from the management server 3. When the image processing apparatus 1 receives the print job, the image processing apparatus 1 transmits a print content acquisition request to the application server 4 in SB020. In SB021, the image processing apparatus 1 receives a response from the application server 4. When the image processing apparatus 1 receives a print content, the image processing apparatus 1 prints the content.

When a change in status occurs during the printing operation, the image processing apparatus 1 issues a status notification using an HTTP protocol in SB022 to SB027 in a similar manner as in SB006 to SB011.

After the printing is completed, when a status change occurs, the image processing apparatus 1 sends a status notification using an HTTP protocol in SB028 to SB033 in a similar manner as SB006 to SB011.

When the user turns off the power of the image processing apparatus 1 in SB034, the image processing apparatus 1 transmits an XMPP disconnect request to the management server 3 in SB035, and receives a response thereto from the management server 3 in SB036. Thus, the XMPP connection is disconnected, and the process of the image processing apparatus 1 is ended.

In the example described above, the status notifications are transmitted using the HTTP protocols. However, in a case in which an always-on XMPP connection is available, an XMPP protocol may be used. More specifically, in SB006, SB022, and SB028 the status notification requests may be transmitted using XMPP, and the status notification responses may be received using XMPP in SB011, SB027, and SB033. When an always-on XMPP connection is not available, a status notification request is transmitted using an HTTP protocol.

In a case where an AC power supply for the image processing apparatus 1 is available, when the image processing apparatus 1 is in a stand-by state with off-state power, communication using the communication interface 18 is possible, an operation is performed as described below.

Figure 16A:
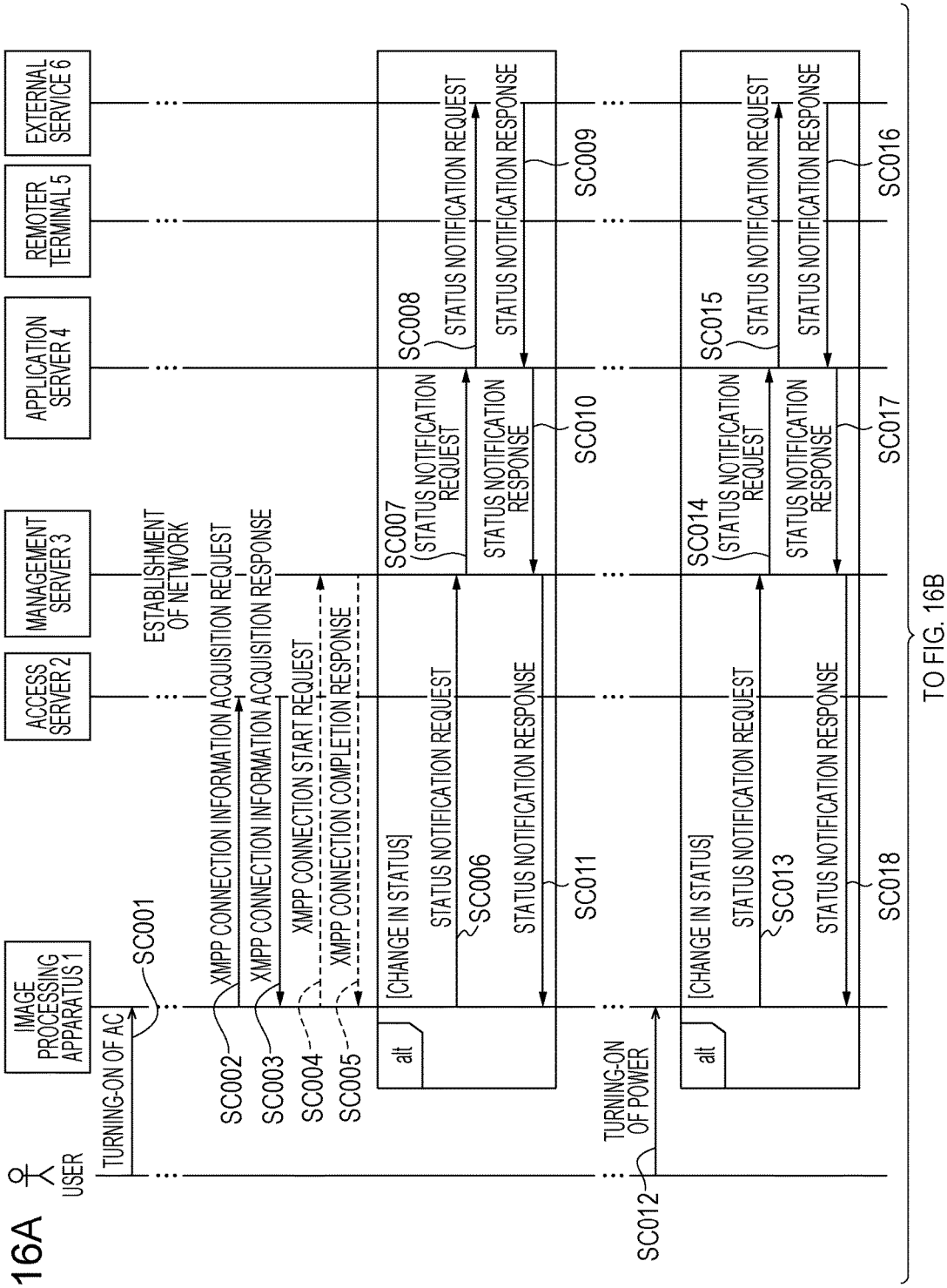
FIGS. 16A and 16B respectively illustrate first and second parts of a sequence diagram of a status notification process performed when an image processing apparatus is in a stand-by state with off-state power.
Figure 16B:
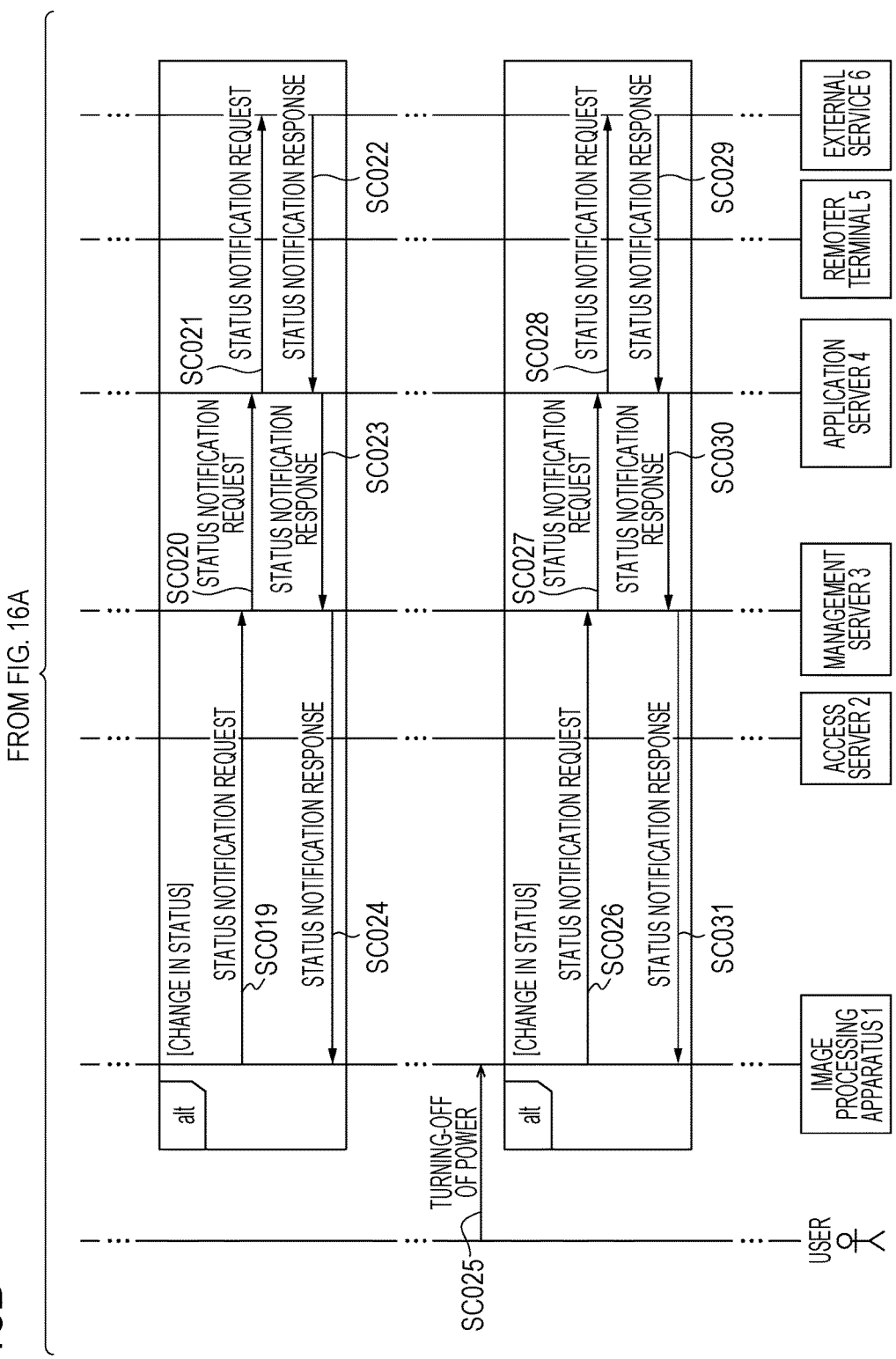

FIGS. 16A and 16B respectively illustrate first and second parts of a sequence diagram of a status notification process performed when the image processing apparatus is in a stand-by state with off-state power.

In SC001, a user turns on the AC power supply for the image processing apparatus 1. As a result, the communication interface 18 is activated and a network is established between the image processing apparatus 1 and the access server 2 such that communication is possible between the image processing apparatus 1 and the access server 2. When the communication becomes possible, the image processing apparatus 1 transmits, in SC002, an XMPP connection information acquisition request using an HTTP protocol to the access server 2. In SC003, the image processing apparatus 1 receives, from the access server 2, a response to the request issued in SC002. The reception in SB003 corresponds to acquisition of XMPP connection information in S6001 in FIG. 4. According to the response in SC003 from the access server 2, a determination is made, as illustrated in FIG. 4, as to whether an XMPP connection is to be started or not. In the example of the sequence in FIGS. 16A and 16B, the XMPP connection is started.

The image processing apparatus 1 transmits an XMPP connection start request to the management server 3 in SC004, and receives a response thereto from the management server 3 in SC005. Thus, the XMPP connection is started. After this, until the XMPP connection is disconnected, it is possible to perform a communication using an XMPP protocol.

When a status change occurs, the image processing apparatus 1 sends a status notification using an HTTP protocol in SC006 to SC011. In SC012, the user turns on the power of the image processing apparatus 1. When a status change occurs, the image processing apparatus 1 sends a status notification using an HTTP protocol in SC013 to SC018. When a further status change occurs, the image processing apparatus 1 sends a status notification using an HTTP protocol in SC019 to SC024. The status notifications in SC006 to SC011, SC013 to SC018, and SC019 to SC024 are performed in a similar manner, for example, as in SA004 to SA009 in FIG. 14A.

In SC025, the user turns off the power of the image processing apparatus 1. In response to a status change, the image processing apparatus 1 sends a status notification using an HTTP protocol in SC026 to SC031 in a similar manner, for example, as in SA004 to SA009 in FIG. 14A.

In the example described above, the status notifications are transmitted using the HTTP protocols. However, an XMPP protocol may be used depending on whether the always-on XMPP connection is available or not and whether the power is in the on-state or the off-state. For example, in a state in which the always-on XMPP connection is available and the power is in the on-state, a status notification may be sent using XMPP. On the other hand, in a state in which the always-on XMPP connection is not established and the power is in the off-state, a status notification may be sent using HTTP.

Note that a status notification may be sent using XMPP regardless of whether an always-on XMPP connection is established or not. More specifically, in a case where the XMPP connection has been already established, the image processing apparatus 1 may send a status notification using the XMPP connection. On the other hand, in a state where the XMPP connection is not established yet, the image processing apparatus 1 may establish an XMPP connection with the management server 3, and the image processing apparatus 1 may transmit a status using the established XMPP connection.

However, when the image processing apparatus 1 establishes a connection with the management server 3 using XMPP, a negotiation is necessary to establish the connection, which may result in an increase in load on the management server 3 compared with a case in which status transmission is performed using HTTP, because the management server 3 needs to establish a connection with a client using XMPP to receive status information in addition to a job notification. That is, the management server 3 establishes a connection using XMPP more often, which results in an increase in load on the management server 3. In reception of status information, for example, in a case where the management server 3 maintains connections using XMPP with many clients, the maintaining of the connections results in an increase in load on the management server 3. On the other hand, in reception of status information, for example, there is a possibility that each time the management server 3 receives status information, a connection to a client using XMPP is established to receive the status information, and the connection is disconnected after the reception of the status information is completed. In this case, performing a negotiation many times results in an increase in load on the management server 3. Furthermore, the image processing apparatus also needs to establish a connection using XMPP, transmit status information, and disconnect the connection each time the image processing apparatus transmits status information, which also results in an increase in load on the image processing apparatus.

Thus, compared with the case in which the status notification is performed using XMPP regardless of whether the always-on connection using XMPP is established or not, a reduction in load on the image processing apparatus 1 and the management server 3 is achieved in the case where the status notification performed using HTTP as illustrated in FIGS. 15A and 15B and FIGS. 16A and 16B.

In a case where the size of status information transmitted by the image processing apparatus 1 varies depending on the situation, transmission of status information may be performed as described below.

Figure 17:
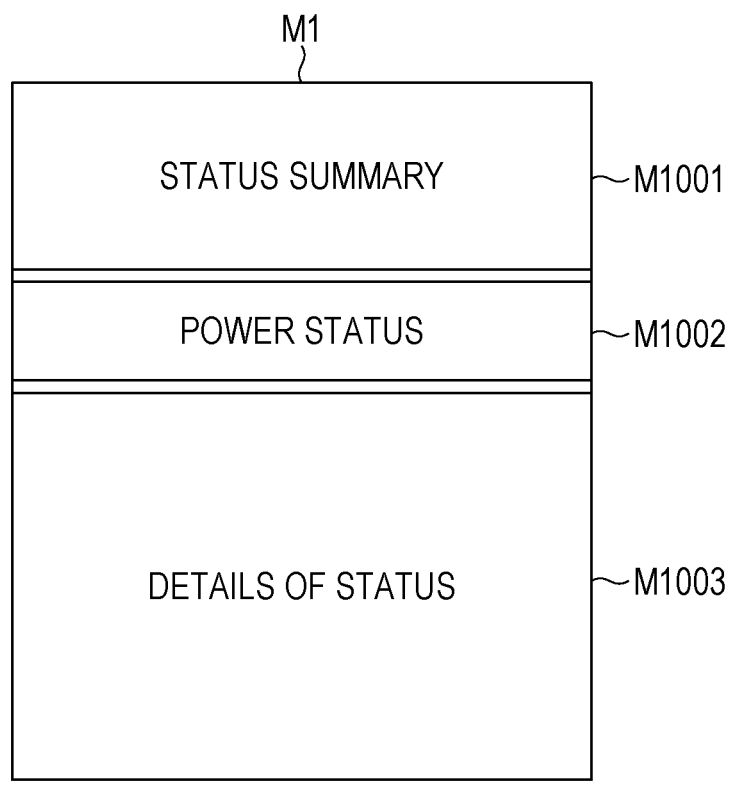
FIG. 17 is a block diagram illustrating a content of status information.

FIG. 17 is a block diagram illustrating a content of status information.

In FIG. 17, M1 denotes status information in a status notification. The status information M1 includes a status summary M1001, power supply information M1002, and status information M1003.

The status summary M1001 is information representing a summary of the status information in the status notification. More specifically, the status summary M1001 represents the summary in terms of an error occurrence, and a remaining amount of consumable supply, or the like. The status summary M1001 provides sufficient information to perform a simplified management of the status of the image processing apparatus 1. The power supply information M1002 is information representing a power supply status of the image processing apparatus 1. This information makes it possible to determine whether the image processing apparatus 1 is in the stand-by state with off-state power.

The status information M1003 is information representing details of the status information in the status notification. For example, let it be assumed by way of example that in a case where status information is sent to the external service 6, it is necessary to provide status information M1003, but status information M1003 is not necessary in the other cases. Thus, when the image processing apparatus 1 transmits status notification, the status information M1003 is added or not added to the status notification depending on the situation. In general, HTTP protocols are more suitable for transmission of data with a large data size than XMPP protocols. Therefore, an HTTP protocol may be used when status information M1003 is added to a status notification and thus the resultant data size is large, while an XMPP protocol may be used when status information M1003 is not added to a status notification and thus the resultant data size is small.

In the present embodiment, as described above, in a case where there is a possibility that a job is issued by an apparatus such as a remote terminal other than an image processing apparatus, the image processing apparatus and a management server are always connected to each other, but in a case where there is no such a possibility, an always-on connection is not established. Therefore, even in a case where there are many image processing apparatuses capable of connecting to a server, each image processing apparatus establishes an always-on connection only when the always-on connection is necessary, and thus it is possible to reduce the load on the server.

In the embodiments described above, by way of example, the image processing apparatus having the image printing capability and the document reading capability has been described as an example of an information processing apparatus. However, the information processing apparatus is not limited to such an image processing apparatus. For example, various kinds of information apparatuses such as a personal computer, a smartphone, a camera, etc. may be possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-229030 filed Nov. 25, 2016, which is hereby incorporated by reference herein in its entirety.

What is claimed is:

1. An information processing apparatus capable of communicating with any of one or more servers according to a first protocol and also capable of communicating with any of the one or more servers according to a second protocol, the information processing apparatus comprising at least one processor, wherein the at least one processor:

establishes, in a case where a particular notification is received via a first connection with any of the one or more servers according to the first protocol, a second connection with any of the one or more servers according to the second protocol and acquires, via the second connection, data to be processed on the information processing apparatus;

executes a process on the data, the process to be executed being dependent on the acquired data; and establishes the second connection for status information on the status of the information processing apparatus with any of the one or more servers in a case where predetermined status of the information processing apparatus is changed, the second connection being established to transmit the status information even in the case that the first connection with any of the one or more servers is not established, wherein the acquisition has a capability of executing:

a first acquisition method in which the data to be processed is acquired by issuing a particular request, via the second connection, to any of the one or more servers, and a second acquisition method in which in a case where a registration process in terms of the information processing apparatus has already been performed in any of the one or more servers, when a request is received from an apparatus different from the information processing apparatus, the particular notification is received via the first connection, and in response to reception of the particular notification, the second connection is established and the data to be processed is acquired via the second connection, and in the case where the registration process has already been performed, the first connection is established, and in the case where the registration process has not been performed, the first connection is not established.

2. The information processing apparatus according to claim 1, wherein the at least one processor establishes the second connection to transmit changed status information even when the particular notification is not received.

3. The information processing apparatus according to claim 1, wherein in a case where the predetermined status is changed and the first connection is established, the at least one processor transmits the status information via the first connection.

4. The information processing apparatus according to claim 1, wherein the transmission means transmits the status information to any of the one or more servers using the first protocol in a case where predetermined information is not added to the status information, and the transmission means transmits the status information to any of the one or more servers using the second protocol in a case where the predetermined information is added to the status information.

5. The information processing apparatus according to claim 1, wherein the registration process is a process for associating a user account with a device account of the information processing apparatus.

6. The information processing apparatus according to claim 1, wherein the at least one processor acquires registration information regarding the particular registration process in terms of the information processing apparatus from any of the one or more servers, and makes a judgment based on the registration information as to whether the first connection is to be established or not, wherein the first connection is established according to the judgement.

7. The information processing apparatus according to claim 1, wherein the particular notification indicates a storage area where the acquired data is stored on any of the one or more servers, and the at least one processor acquires the data from the storage area indicated by the particular notification.

8. The information processing apparatus according to claim 1, wherein the first protocol is XMPP, and the second protocol is HTTP.

9. The information processing apparatus according to claim 1, wherein even when the first connection is not established between the information processing apparatus and the any of the one or more servers, the first connection can be established according to a command issued by a user via an operation device of the information processing apparatus.

10. The information processing apparatus according to claim 1, wherein the at least one processor acquires data to be printed from the any of the one or more servers, the at least one processor executes a printing process using the acquired data, and when a change in a recording agent or a printing sheet used in the printing process occurs, the at least one processor transmits such change to the any one or more servers as the status information.

11. An information processing system including one or more servers and an information processing apparatus, the information processing apparatus being capable of communicating with any of the one or more servers according to a first protocol and capable of communicating with any of the one or more servers according to a second protocol, the information processing apparatus comprising at least one first processor, wherein the at least one processor:

establishes, in a case where a particular notification is received via a first connection with any of the one or more servers according to the first protocol, a second connection with any of the one or more servers according to the second protocol and acquires, via the second connection, data to be processed on the information processing apparatus;

executes a process on the acquired data, the process to be executed being dependent on the acquired data; and establishes the second connection to transmit information on the status of the information processing apparatus to any of the one or more servers in a case where predetermined status information of the information processing apparatus is changed, the second connection being established to transmit status information even in the case that the first connection with any of the one or more servers is not established, any of the one or more servers comprising at least one second processor, wherein the at least one second processor:

sends, in a case where the first connection to the information processing apparatus is established, the particular notification to the information processing apparatus; and receives the status information transmitted by the transmission, wherein the acquisition has a capability of executing:

a first acquisition method in which the data to be processed is acquired by issuing a particular request, via the second connection, to any of the one or more servers, and a second acquisition method in which in a case where a registration process in terms of the information processing apparatus has already been performed in any of the one or more servers, when a request is received from an apparatus different from the information processing apparatus, the particular notification is received via the first connection, and in response to reception of the particular notification, the second connection is established and the data to be processed is acquired via the second connection, in the case where the registration process has already been performed, the first connection is established, and in the case where the registration process has not been performed, the first connection is not established.

12. A method performed by at least one processor of an information processing apparatus, the information processing apparatus being capable of communicating with any of one or more servers according to a first protocol and also capable of communicating with any of the one or more servers according to a second protocol, the method comprising:

acquiring data to be processed such that in a case where a particular notification is received via a first connection with any of the one or more servers according to the first protocol, a second connection with any of the one or more servers is established according to the second protocol and the data to be processed on the information processing apparatus is acquired via the second connection;

executing a process on the acquired data, the process to be executed being dependent on the acquired data; and transmitting status information to any of the one or more servers via the second connection in a case where predetermined status information of the information processing apparatus is changed, wherein the second connection is established even in a state in which the first connection is not established, wherein the acquisition has a capability of executing:

a first acquisition method in which the data to be processed is acquired by issuing a particular request, via the second connection, to any of the one or more servers, and a second acquisition method in which in a case where a registration process in terms of the information processing apparatus has already been performed in any of the one or more servers, when a request is received from an apparatus different from the information processing apparatus, the particular notification is received via the first connection, and in response to reception of the particular notification, the second connection is established and the data to be processed is acquired via the second connection, and in the case where the registration process has already been performed, the first connection is established, and in the case where the registration process has not been performed, the first connection is not established.

13. The control method according to claim 12, wherein in the transmitting, the second connection is established to transmit status information even when the particular notification is not received.

14. The control method according to claim 13, wherein in the transmitting, in a case where the predetermined status is changed and the first connection is established, the status information is transmitted via the first connection.

15. The control method according to claim 12, wherein in the transmitting, the status information is transmitted to any of the one or more serves using the first protocol in a case where predetermined information is not added to the status information, and the status information is transmitted to any of the one or more serves using the second protocol in a case where the predetermined information is added to the status information.

16. The control method according to claim 12, wherein the registration process is a process for associating a user account with a device account of the information processing apparatus.

17. The control method according to claim 12, further comprising a making a judgment, the making of the judgement including acquiring registration information regarding the particular registration process in terms of the information processing apparatus from any of the one or more servers, and making the judgment based on the registration information as to whether the first connection is to be established or not, wherein the first connection is established according to the judgement.

18. The control method according to claim 12, wherein the particular notification indicates a storage area where the acquired data is stored on any of the one or more servers, and the acquisition acquires the data from the storage area indicated by the particular notification.

19. The control method according to claim 12, wherein the first protocol is XMPP, and the second protocol is HTTP.

20. The control method according to claim 12, wherein in the acquiring, data to be printed is acquired, in the executing, printing is executed, as the process, on the data to be printed, and in the transmitting, when a change in the status in terms of a recording agent or a printing sheet used in the printing occurs as the status change, the status information is transmitted.

21. The information processing apparatus according to claim 1, in the case where power of the information processing apparatus is turned on and the registration process has already been performed, the first connection is established, and in the case where the power of the information processing apparatus is turned on and the registration process has not been performed, the first connection is not established.

22. The information processing apparatus according to claim 10, wherein the status information indicates at least one of an ink-low error, a no-ink error, a no-sheet error, and a jam error.

* * * * *